(12) United States Patent
Richter et al.

(10) Patent No.: US 11,367,416 B1
(45) Date of Patent: Jun. 21, 2022

(54) PRESENTING COMPUTER-GENERATED CONTENT ASSOCIATED WITH READING CONTENT BASED ON USER INTERACTIONS

(71) Applicant: Apple Inc., Cupertino, CA (US)

(72) Inventors: Ian M. Richter, Los Angeles, CA (US); Andrew Scott Robertson, Los Angeles, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 16/834,683

(22) Filed: Mar. 30, 2020

Related U.S. Application Data

(60) Provisional application No. 62/867,384, filed on Jun. 27, 2019.

(51) Int. Cl.
    *G09G 5/36* (2006.01)
    *G06T 11/00* (2006.01)
    *G06F 3/0346* (2013.01)

(52) U.S. Cl.
    CPC ............. *G09G 5/36* (2013.01); *G06F 3/0346* (2013.01); *G06T 11/00* (2013.01); *G09G 2340/12* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 9,262,984 B2 * | 2/2016 | Jung | G06F 1/1626 |
| 10,558,037 B2 | 2/2020 | Piemonte et al. | |
| 2013/0314320 A1 * | 11/2013 | Hwang | G06F 3/0346 345/158 |
| 2014/0210860 A1 * | 7/2014 | Caissy | G06F 3/0338 345/659 |
| 2014/0361971 A1 * | 12/2014 | Sala | G06F 3/041 345/156 |
| 2016/0343345 A1 * | 11/2016 | Moon | G06F 3/0346 |

FOREIGN PATENT DOCUMENTS

| | | | | |
|---|---|---|---|---|
| WO | WO-2017053616 A1 * | 3/2017 | ............ | B60K 35/00 |

OTHER PUBLICATIONS

"BMW's Augmented Reality Glasses Turns Man Into Master Mechanic, Mark Wilson Sep. 4, 2009" video found at "https://www.youtube.com/watch?v=Y5ywMb6SeGc" (Year: 2009).*

"Wonderscope: An Augmented Reality iOS App for Kids", Retrieved from the Internet on Mar. 26, 2020: https://wonderscope.com/index.html. pp. 1-3.

* cited by examiner

*Primary Examiner* — Yi Wang
(74) *Attorney, Agent, or Firm* — Fernando & Partners, LLP

(57) ABSTRACT

In accordance with some implementations, a method is performed at an electronic device with one or more processors, a non-transitory memory, one or more input devices, and a display. The method includes displaying, on the display, a reader interface including one or more portions of reading content. The method further includes detecting, via the one or more input devices, a first positional change input. The first positional change input is indicative of the electronic device changing from a first position to a second position. The method further includes, in response to detecting the first positional change input, ceasing to display the reader interface including the one or more portions of reading content, and displaying, on the display, one or more computer-generated representations corresponding to the one or more portions of reading content.

20 Claims, 39 Drawing Sheets

Figure 3K

Blue the Dog

Blue was a good dog and was always loyal to his own sometimes, Blue could be mischievous. For example, day, Blue decided to hop the fence and find a nice tall sleep under. After searching for a while, he found a ve and began walking towards it. After he reached the tr butterfly flitting about. Having never seen a butterfly, B Catalogue of Animal Objective-effectuators Current Selection: Butterfly

Figure 3L

PRESENTING COMPUTER-GENERATED CONTENT ASSOCIATED WITH READING CONTENT BASED ON USER INTERACTIONS

CROSS-REFERENCE TO RELATED APPLICATION

This application claims priority to U.S. Provisional Patent App. No. 62/867,384 filed on Jun. 27, 2019, which is hereby incorporated by reference in its entirety.

TECHNICAL FIELD

The present disclosure relates to presenting a computer-generated environment, and, in particular, presenting a computer-generated environment including computer-generated content associated with reading content based on user interactions.

BACKGROUND

Text content may be presented through a variety of mediums, including physical mediums (e.g., book, newspaper, magazine) and electronic mediums (e.g., online article, e-reader). Previously available systems do not obtain and/or present computer-generated reality (CGR) content that is associated with the text content based on how a user interacts with the text content and/or a device used to view the text content. For example, previously available systems do not present CGR content based on a portion of the text content with which the user is currently engaged or in response to obtaining certain user input.

SUMMARY

In accordance with some implementations, a method is performed at an electronic device with one or more processors, a non-transitory memory, an eye tracking sensor, and an image sensor. The method includes obtaining, from the image sensor, pass-through image data bounded by a field-of-view associated with the image sensor. The pass-through image data includes reading content. The method further includes obtaining a gaze vector, using the eye tracking sensor. The gaze vector characterizes a sightline based on eye tracking values. The method further includes identifying, from the pass-through image data and the sightline characterized by the gaze vector, a portion of the reading content associated with a first region where the sightline intersects a surface including the reading content. The method further includes presenting one or more computer-generated reality (CGR) representations corresponding to the portion of the reading content.

In accordance with some implementations, a method is performed at an electronic device with one or more processors, a non-transitory memory, one or more input devices, and a display. The method includes displaying, on the display, a reader interface including one or more portions of reading content. The method further includes detecting, via the one or more input devices, a first positional change input. The first positional change input is indicative of the electronic device changing from a first position to a second position. The method further includes, in response to detecting the first positional change input, ceasing to display the reader interface including the one or more portions of reading content and displaying, on the display, one or more computer-generated reality (CGR) representations corresponding to the one or more portions of reading content.

In accordance with some implementations, an electronic device includes one or more processors, a non-transitory memory, optionally an image sensor, optionally an eye tracking sensor, optionally a display, and one or more programs. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

SUMMARY

Figure 1:
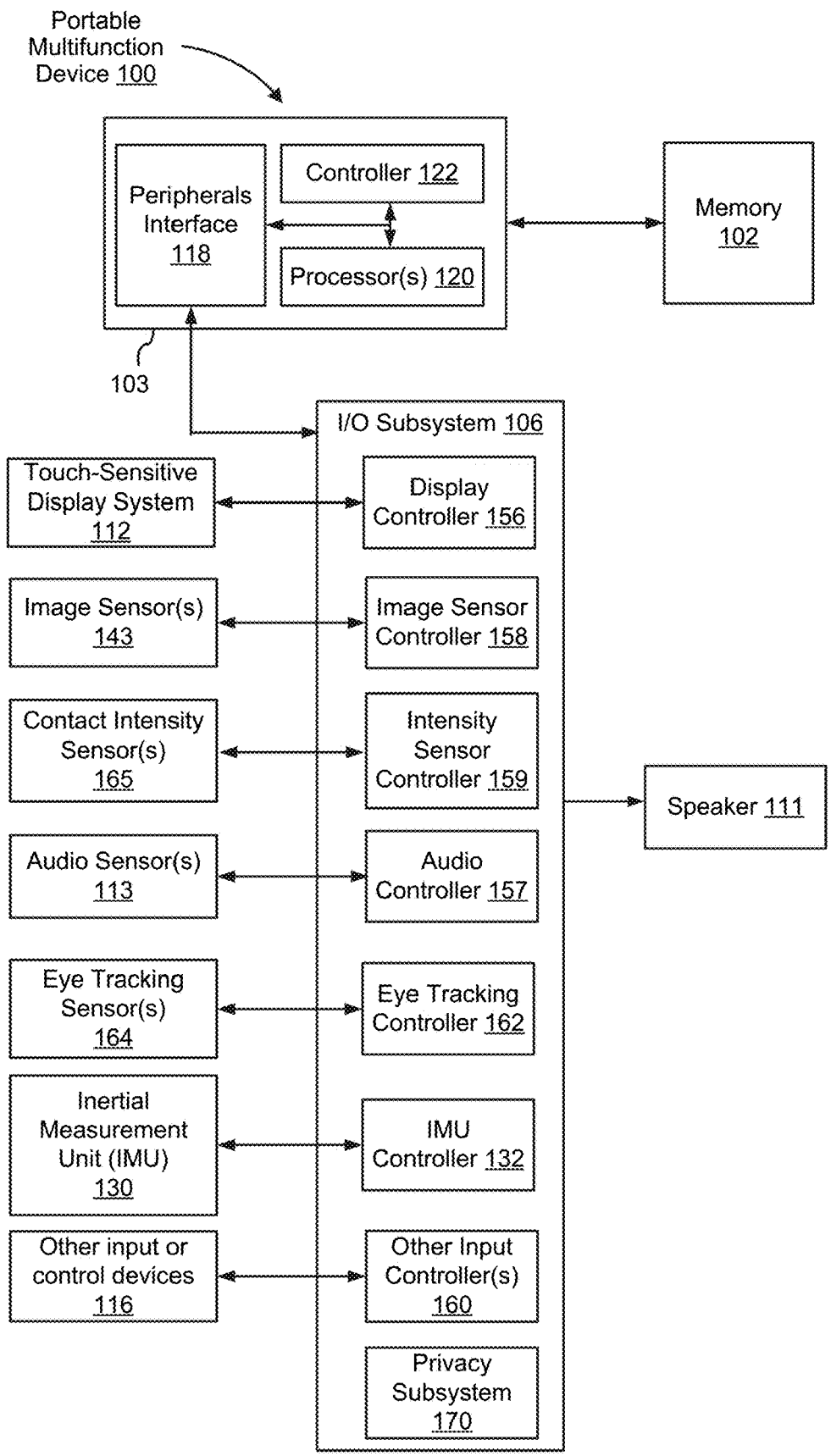
FIG. 1 is a block diagram of an example of a portable multifunction device in accordance with some implementations.

Various implementations provide methods, electronic devices, and systems that present CGR content that is associated with reading content based on eye tracking and/or other inputs. In some implementations, a method includes determining a portion of the reading content on which the user is focused on based on pass-through image data and a gaze vector. In various implementations, the gaze vector is based on a suitable combination of eye tracking information, head pose information, and/or body pose information. The method further includes presenting CGR content associated with the portion of the reading content. In some implementations, the method includes presenting the CGR content in response to determining that the gaze vector and the pass-through image data indicate that the gaze location of the user is within a threshold distance from previously viewed reading content. In other words, the method includes presenting a virtual mind's eye view including CGR content based on the last portion of the reading content associated with a previous gaze vector and the gaze vector currently indicating the absence of reading content.

According to some implementations, the method includes presenting the CGR content (e.g., overlaid on a physical object within a physical environment) in response to detecting a positional change input. For example, an inertial measurement unit (IMU) of an electronic device detects the positional change input indicating the electronic device has been shaken or the orientation of the electronic device has changed. As another example, in some implementations, in response to detecting the positional change input, the method includes displaying a CGR object having a spatial relationship with the physical object matching performance criteria, such as a CGR book object sitting on a physical table. Moreover, in some implementations, the method includes presenting the CGR content while displaying the CGR object and the pass-through image data.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the Sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), and other input or control device(s) 116. In some implementations, the electronic device 100 corresponds to one of a mobile phone, tablet, laptop, wearable computing device, head-mountable device (HMD), head-mountable enclosure (e.g. the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 162, one or more input controllers 160 for other input or control devices, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a physical environment, such as location and/or orientation information of the electronic device 210 relative to the first physical environment 205 in FIG. 2A.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) corresponds to one or more HMD cameras.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the back of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2A:
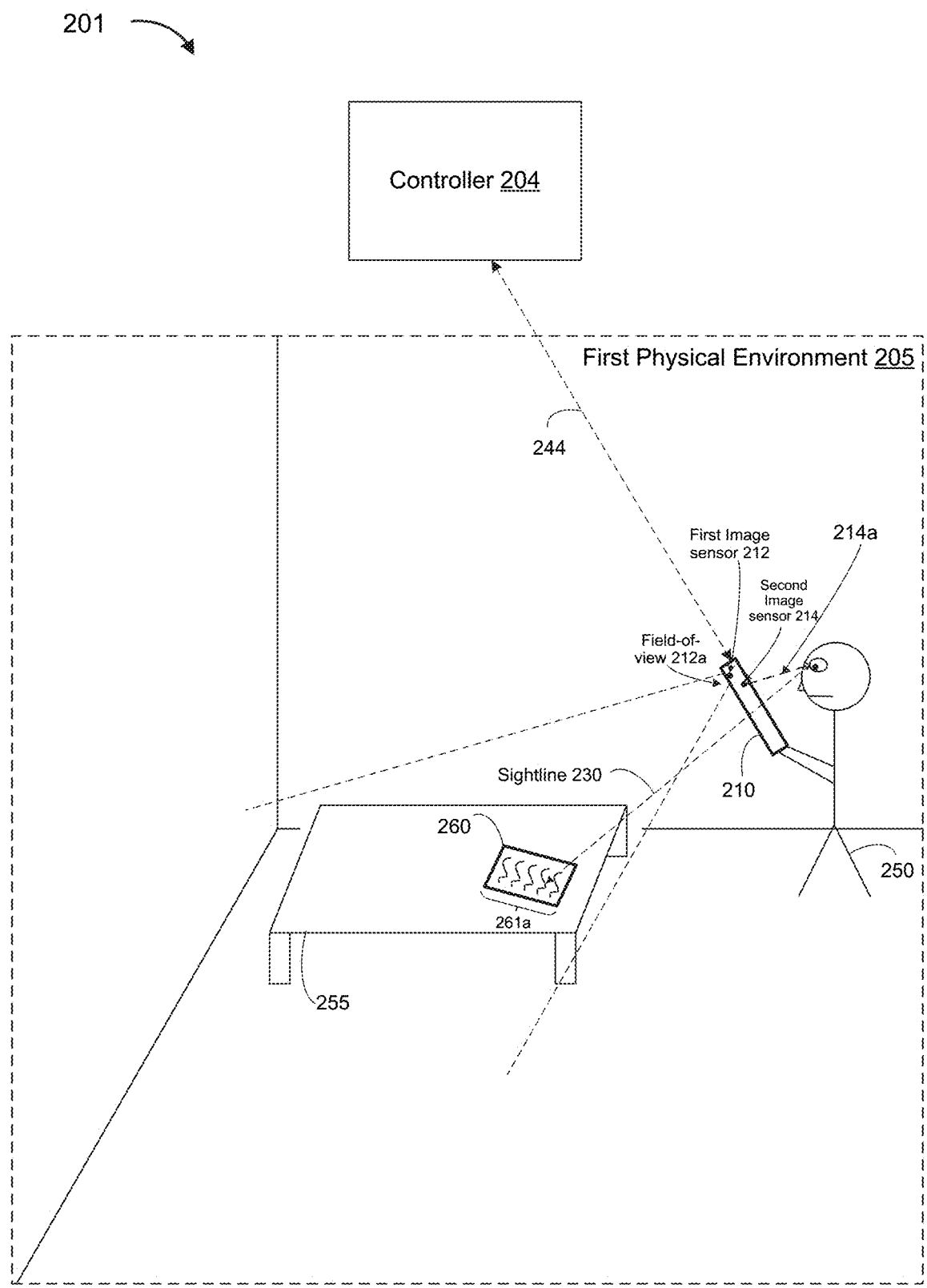
FIGS. 2A-2P are examples of presenting CGR representations based on a gaze vector in accordance with some implementations.
Figure 2B:
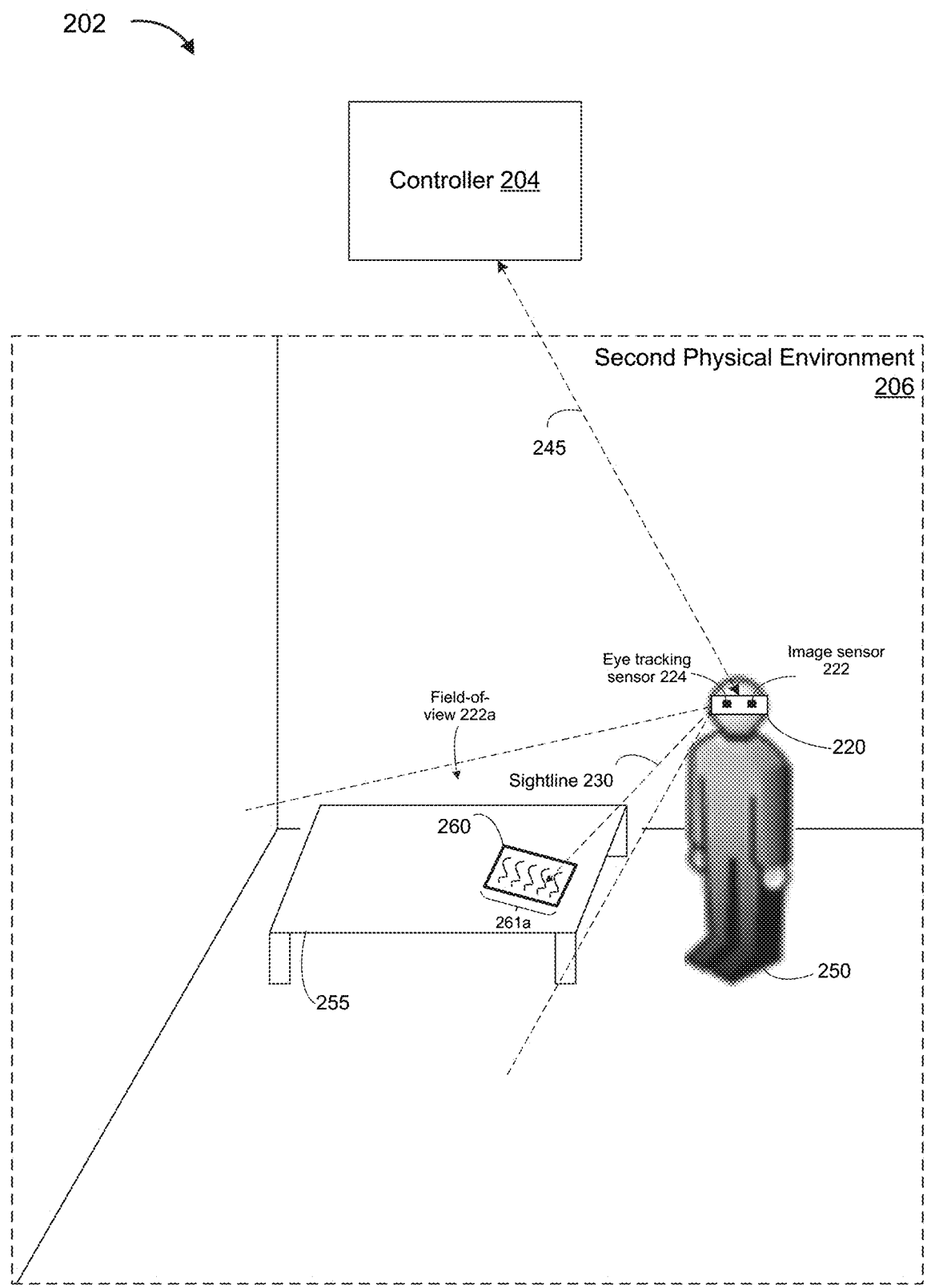
Figure 2C:
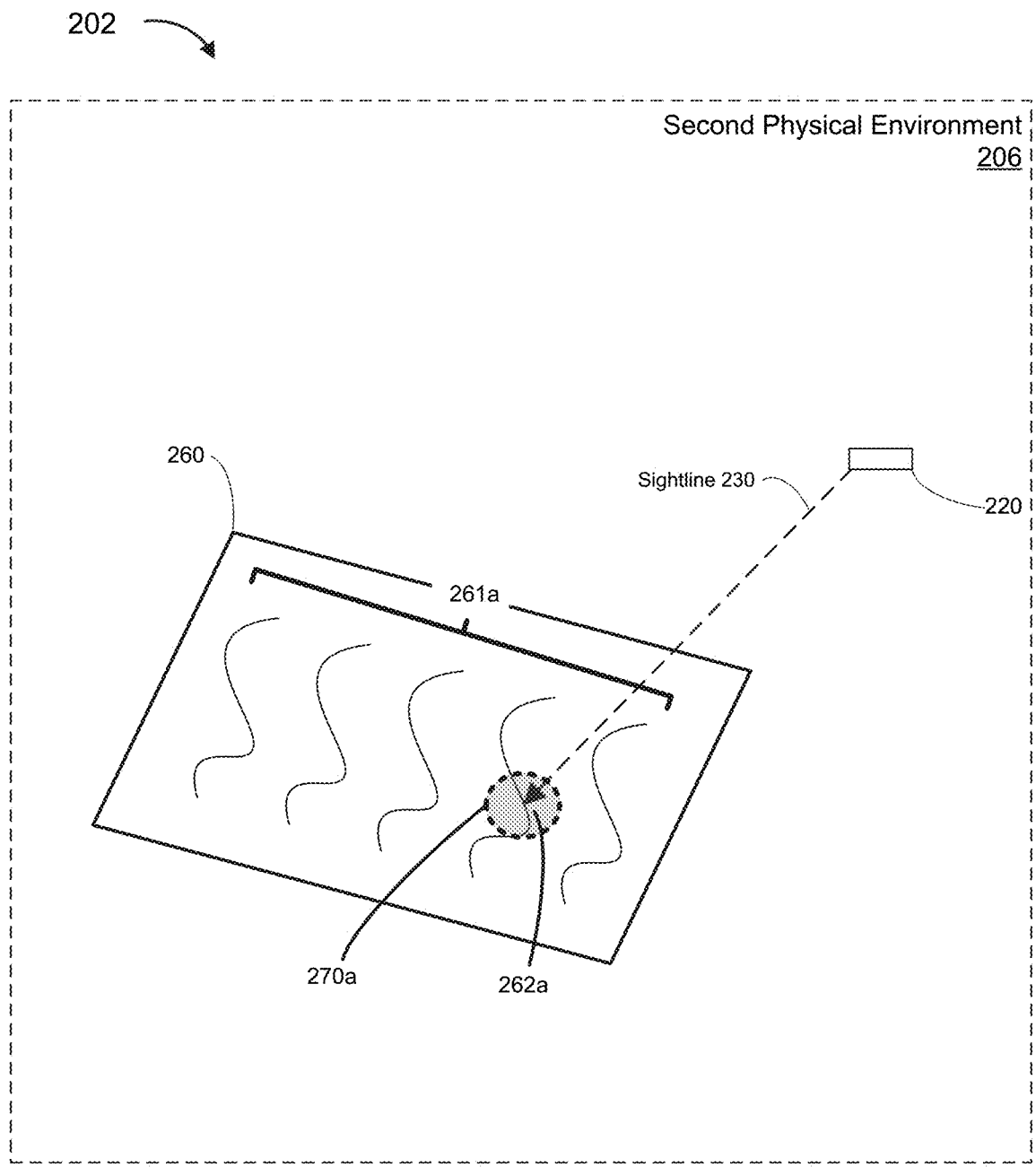
Figure 2D:
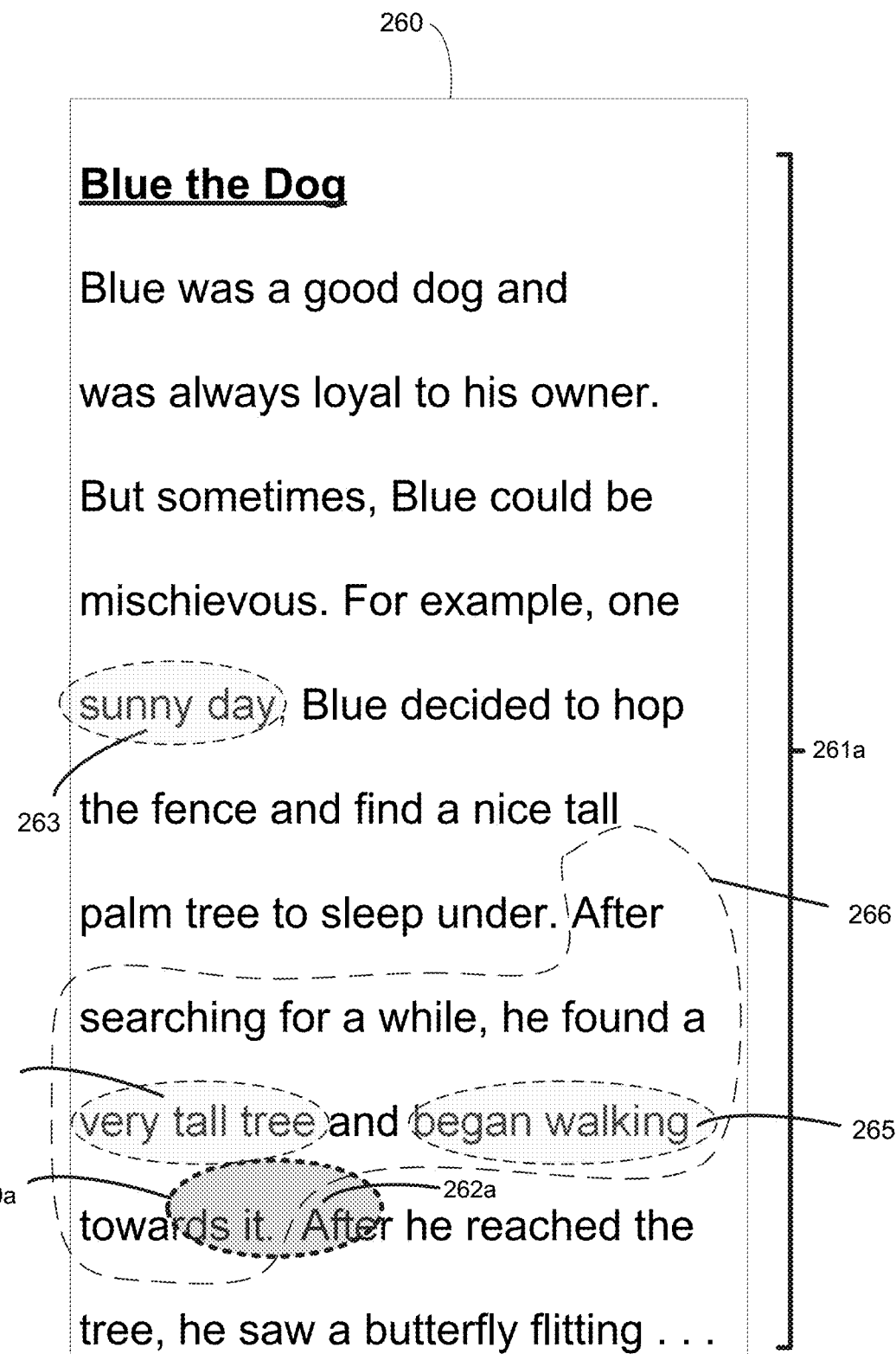
Figure 2E:
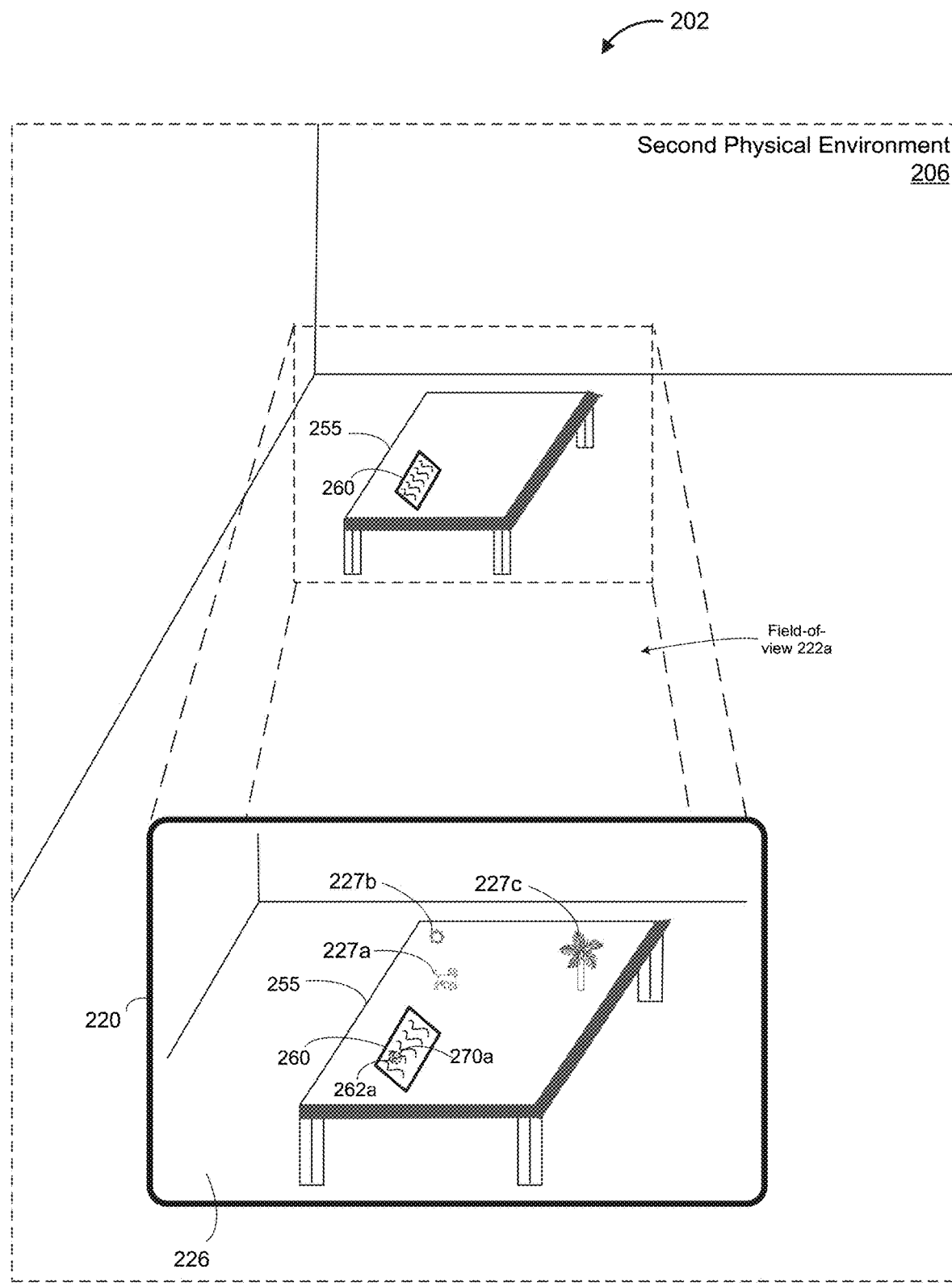
Figure 2F:
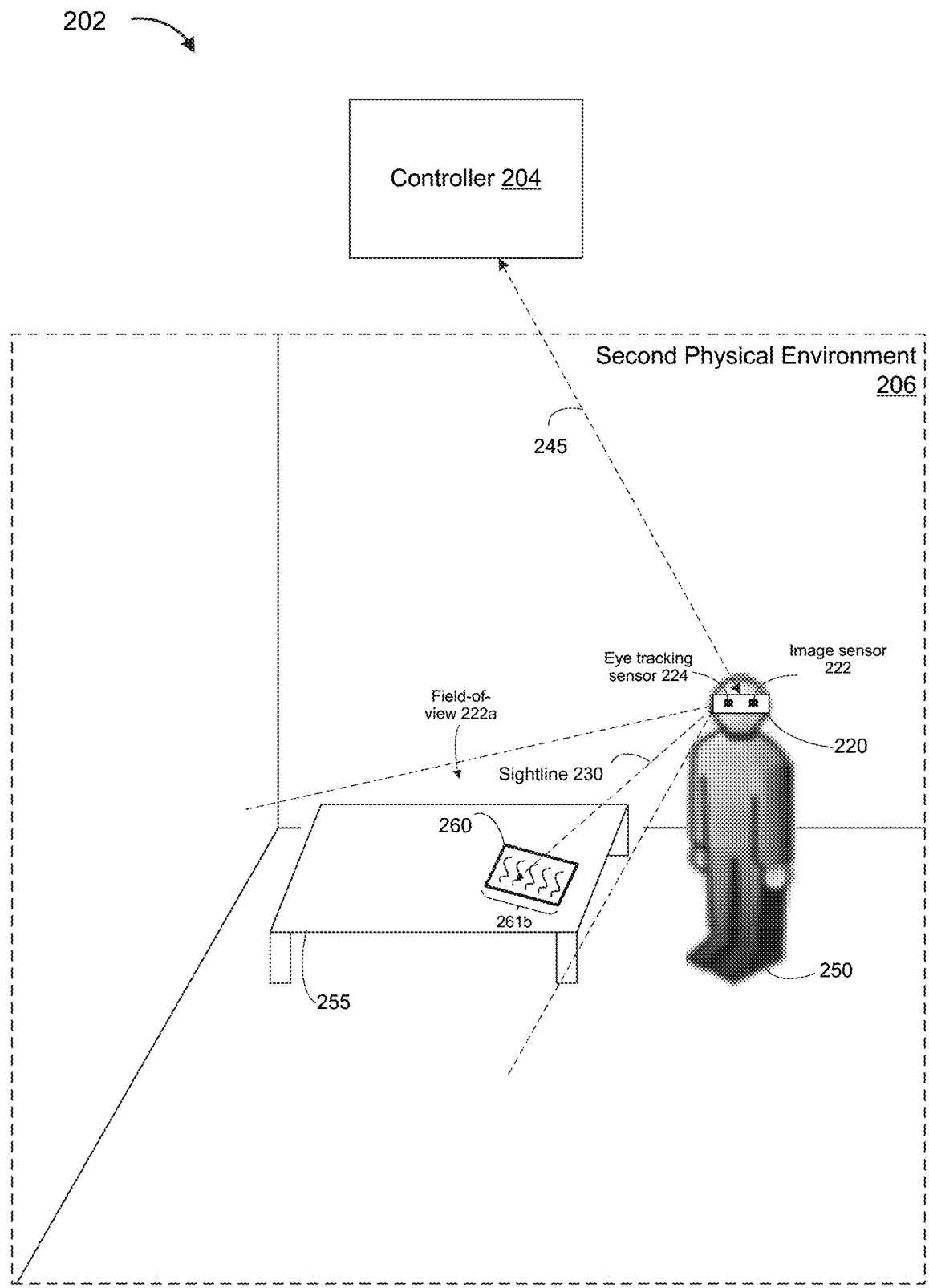
Figure 2G:
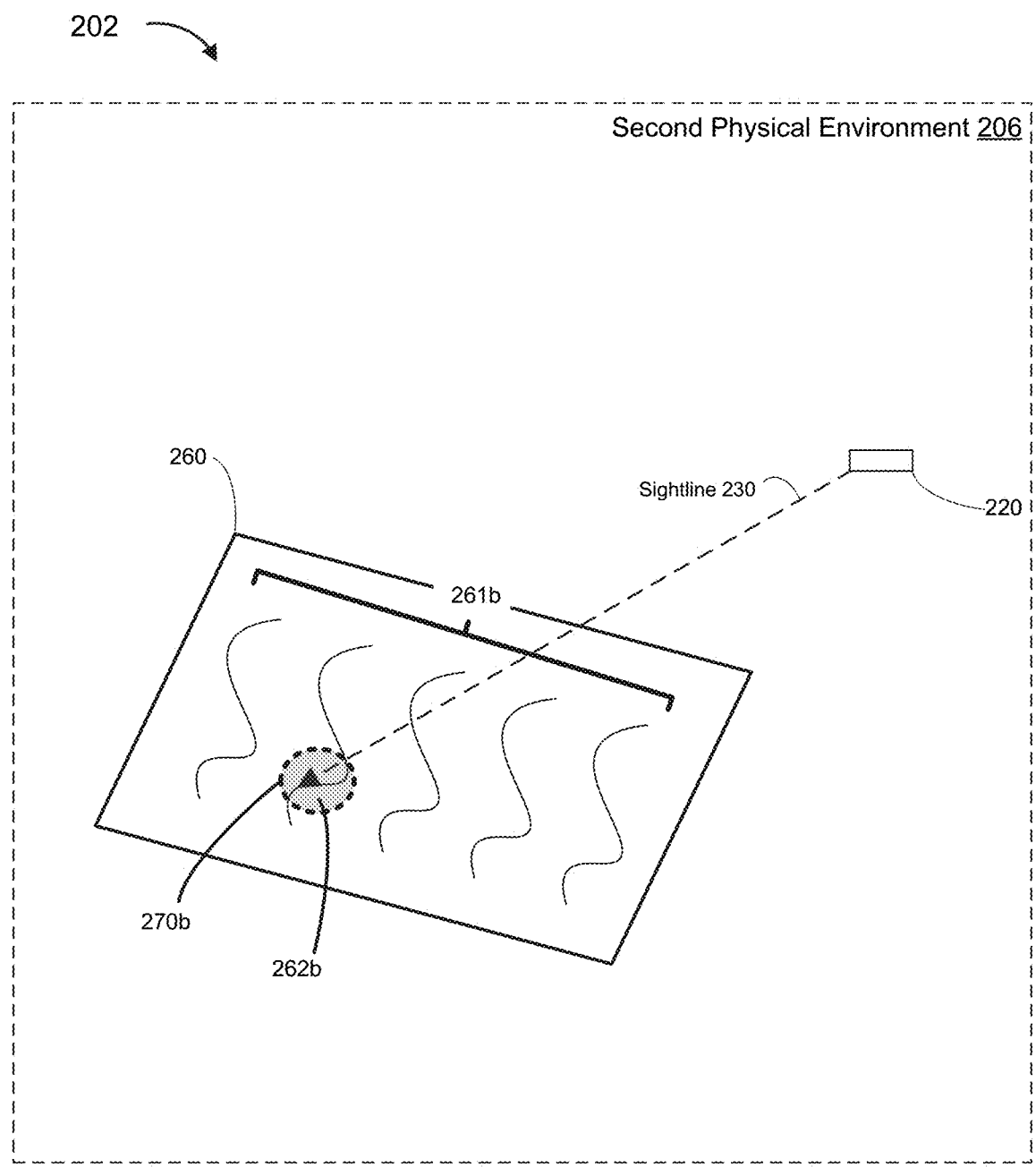
Figure 2H:
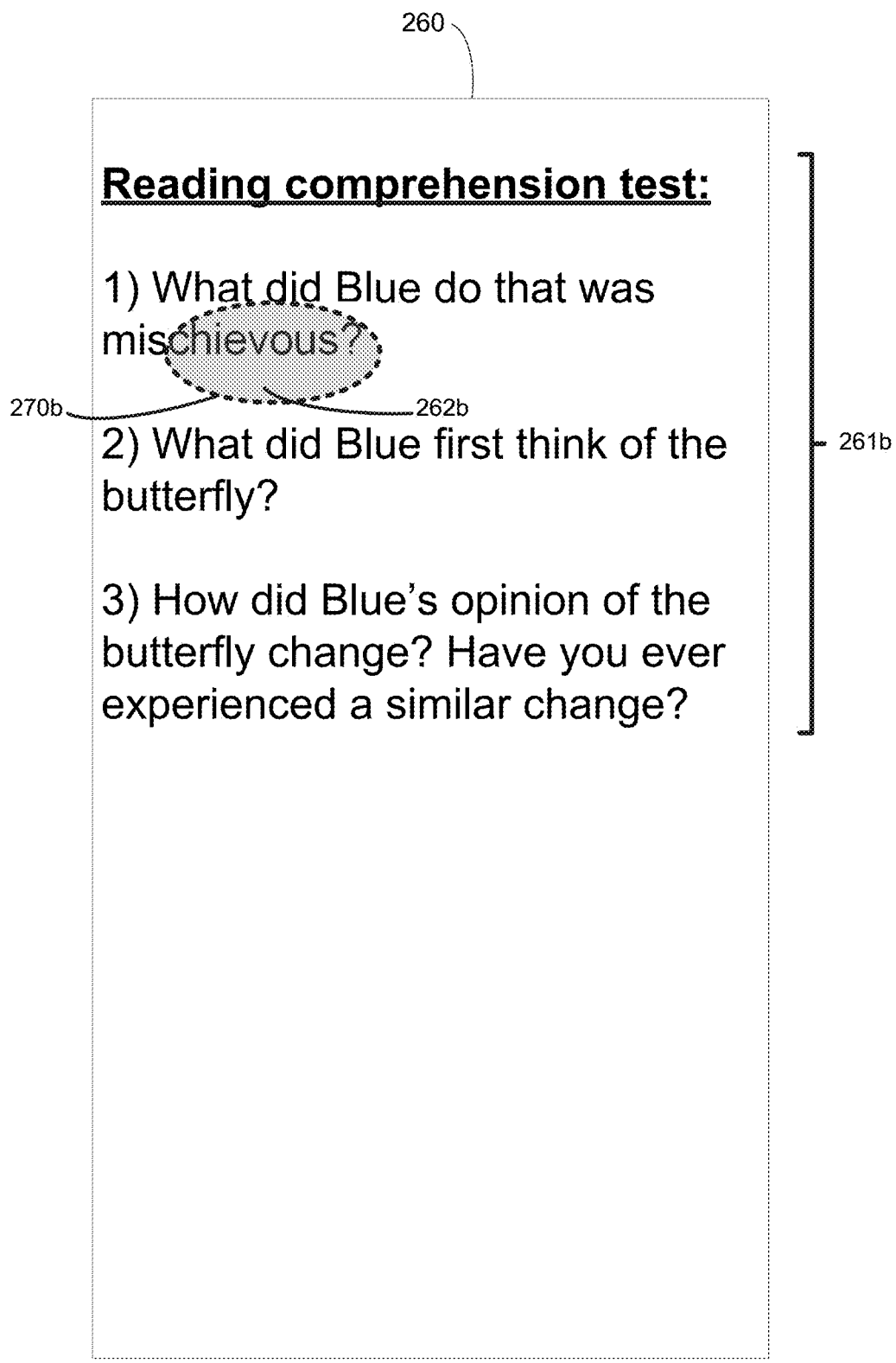
Figure 2I:
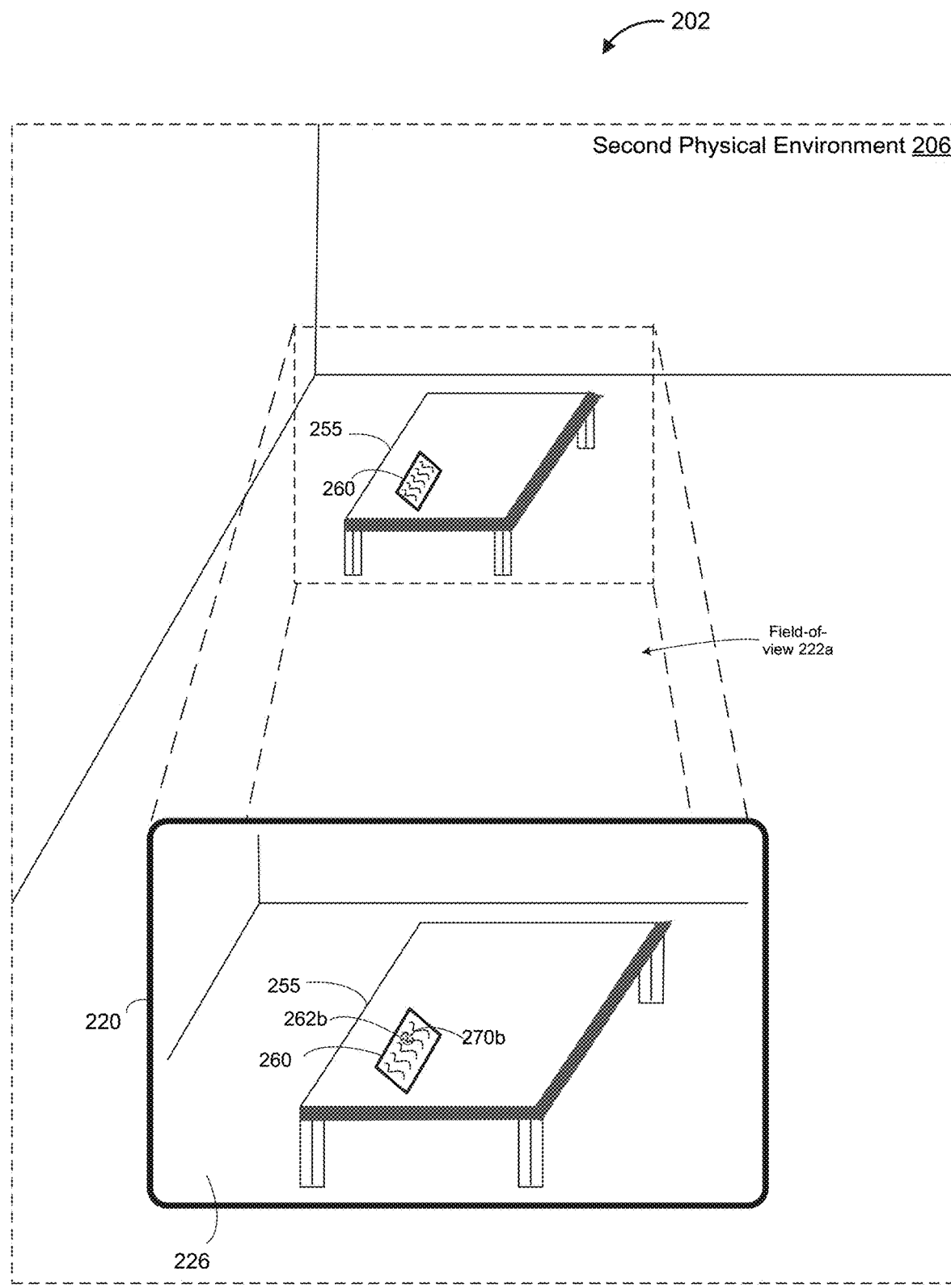
Figure 2J:
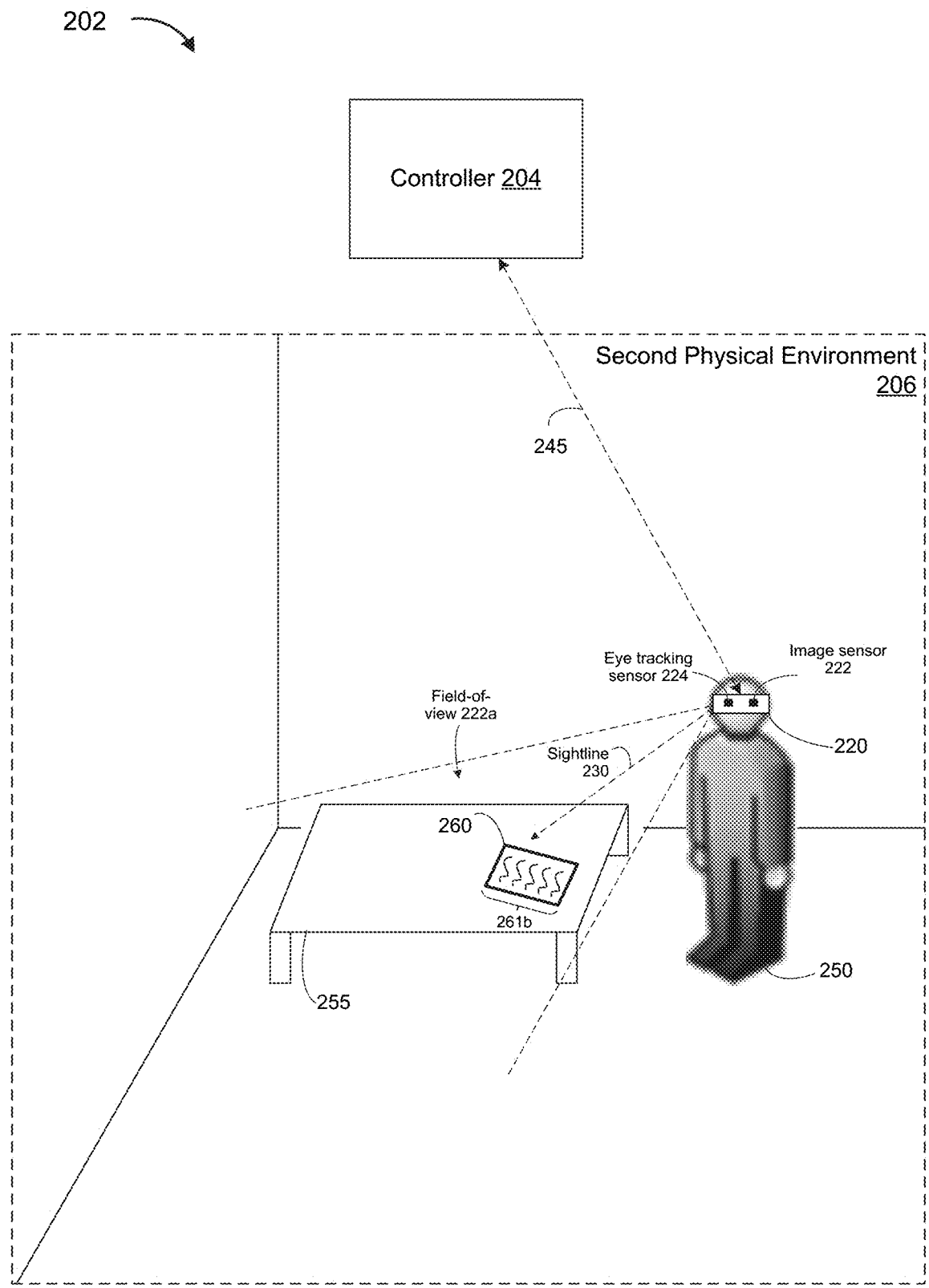
Figure 2K:
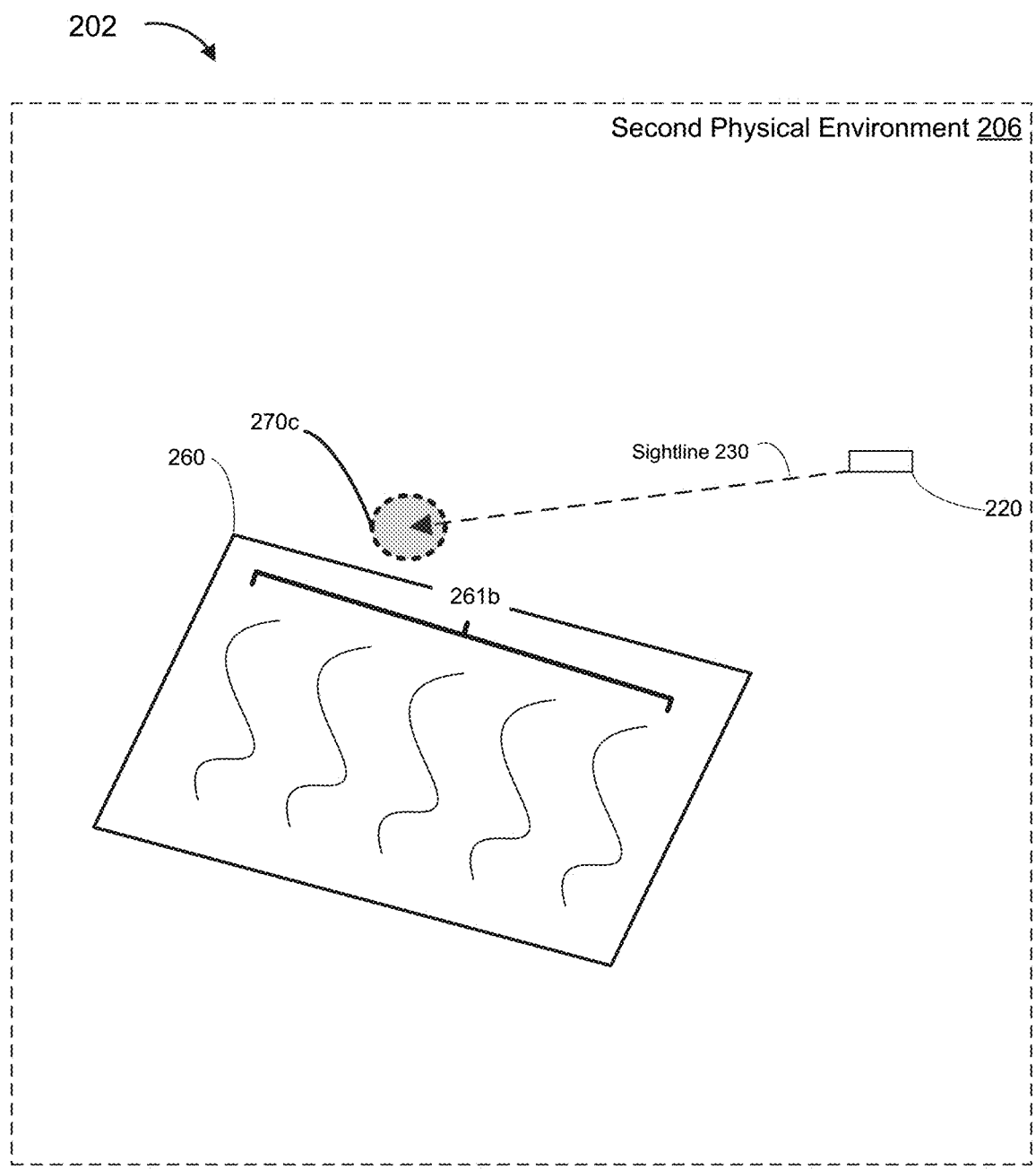
Figure 2L:
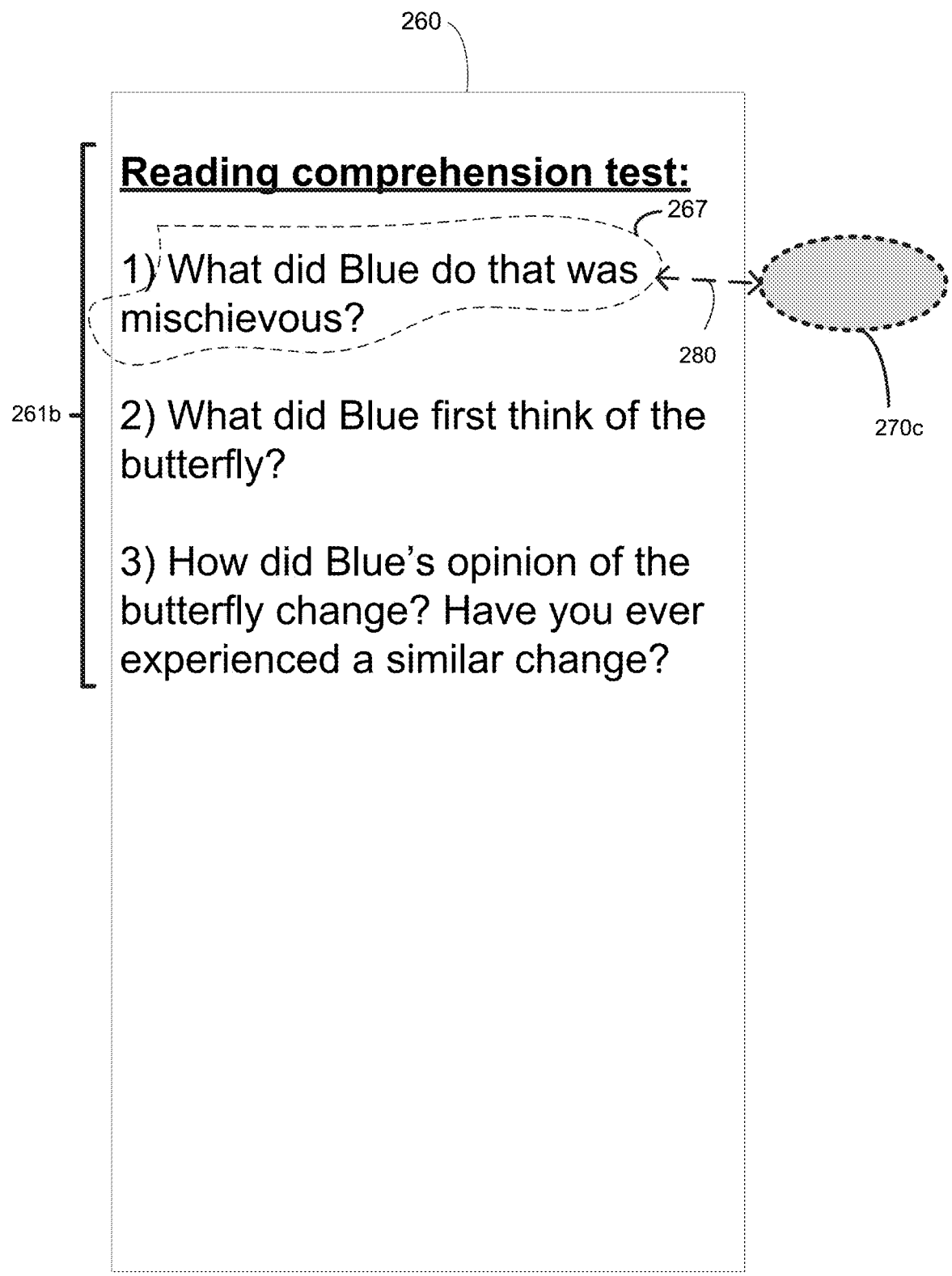
Figure 2M:
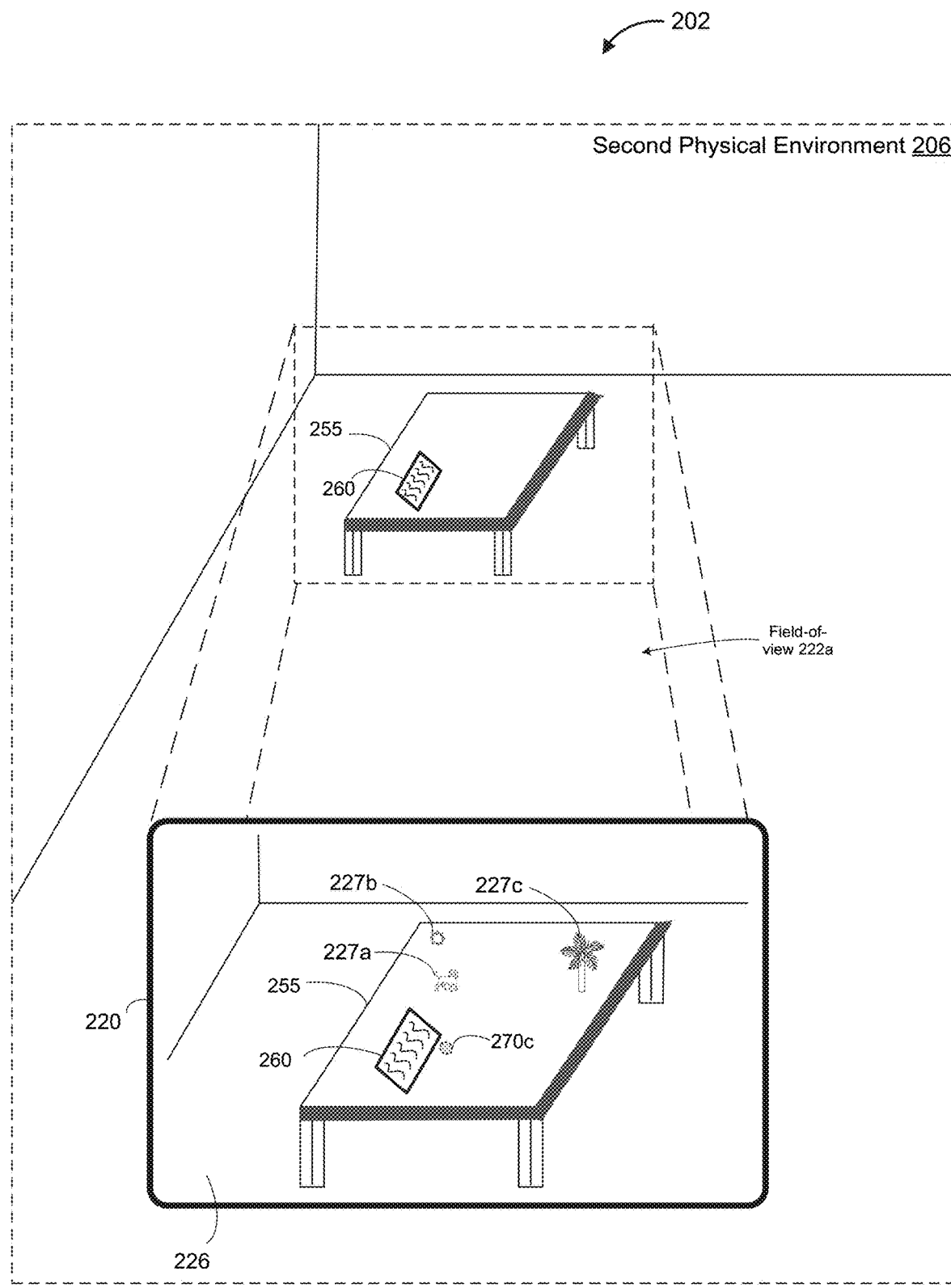
Figure 2N:
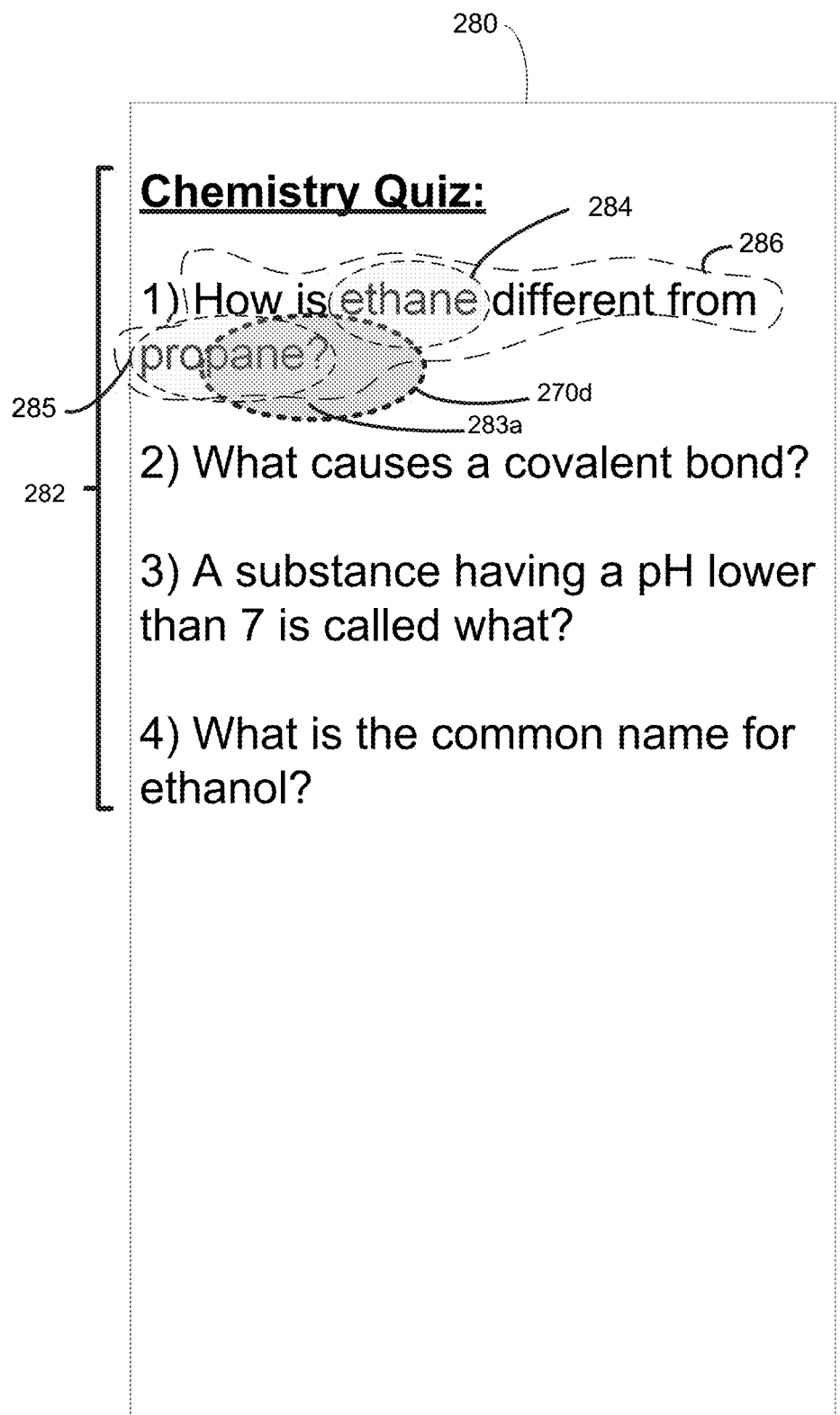
Figure 2O:
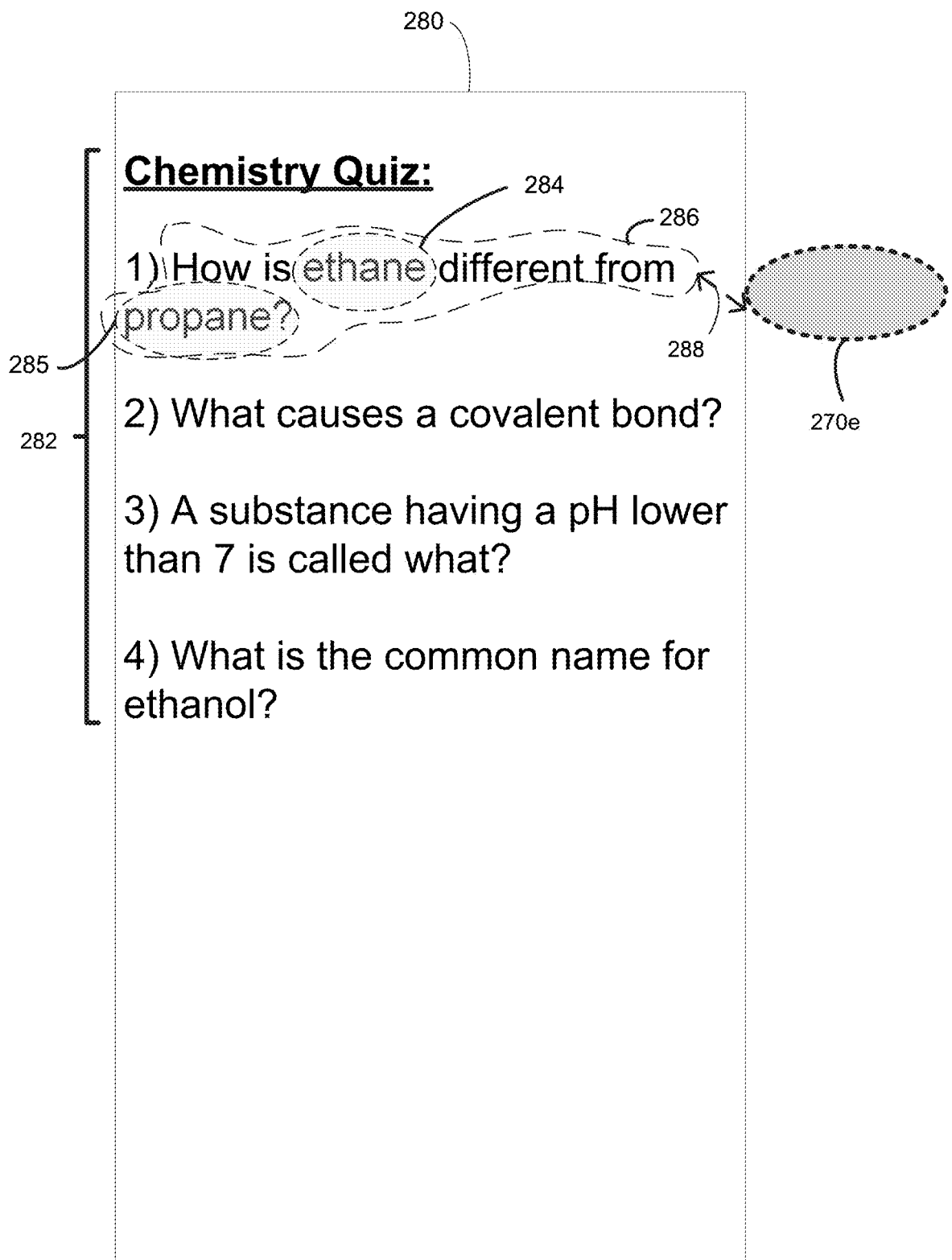
Figure 2P:
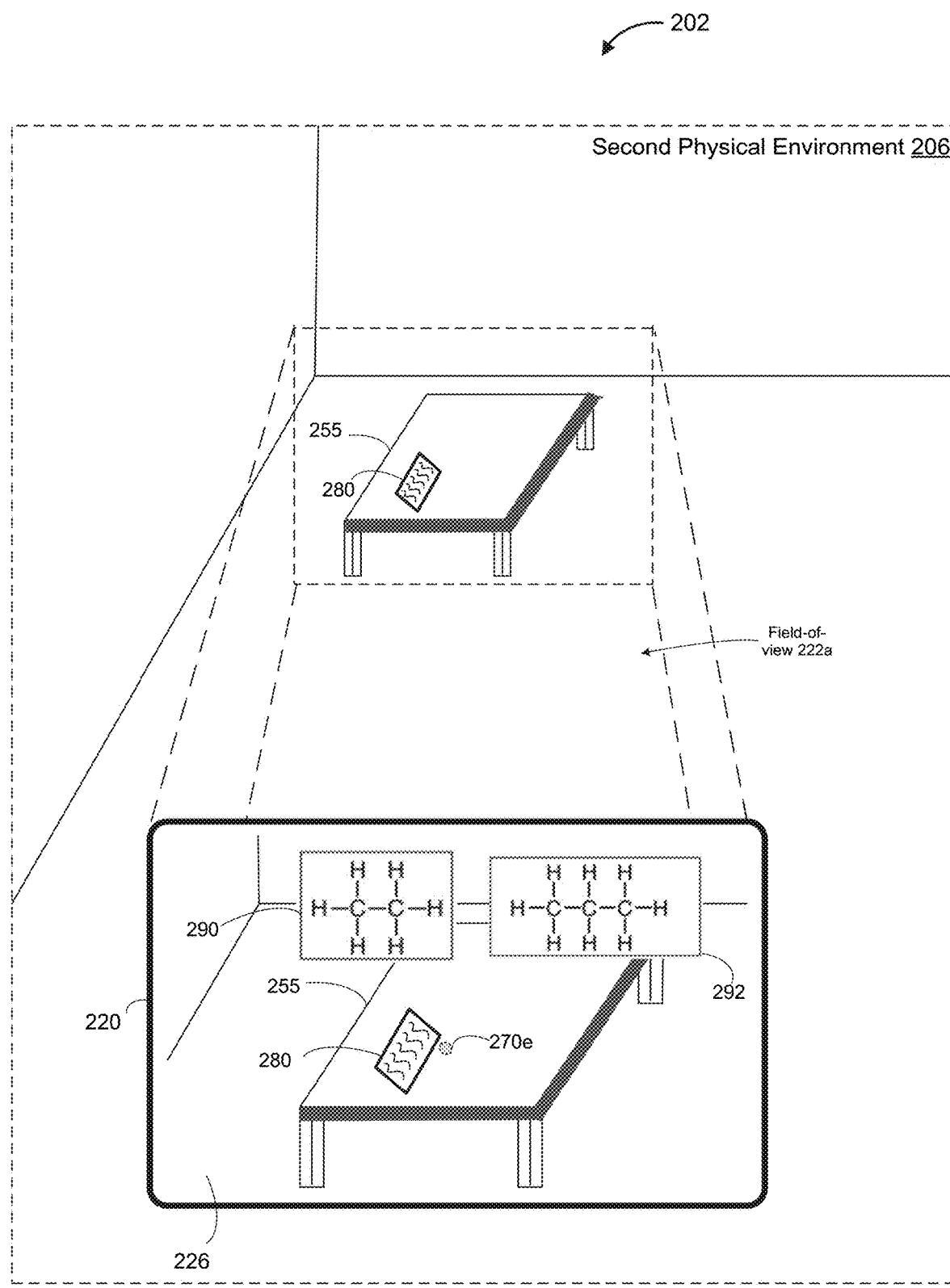

FIGS. 2A-2P are examples of presenting CGR representations based on a gaze vector according to some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, in some implementations, as illustrated in FIG. 2A, a first operating environment 201 includes an electronic device 210 within a first physical environment 205 and a controller 204.

According to various implementations, the controller 204 is configured to manage and coordinate a CGR experience for a user 250. In some implementations, the controller 204 includes a suitable combination of software, firmware, and/or hardware. In some implementations, the controller 204 is a computing device that is local or remote relative to the first physical environment 205. For example, the controller 204 is a local server located within the first physical environment 205. In another example, the controller 204 is a remote server located outside of the first physical environment 205 (e.g., a cloud server, central server, etc.). In some implementations, the controller 204 is integrated within the electronic device 210. In some implementations, the controller 204 is communicatively coupled with the electronic device 210 via one or more wired or wireless communication channels 244 (e.g., BLUETOOTH, IEEE 802.11x, IEEE 802.16x, IEEE 802.3x, etc.).

According to various implementations, the electronic device 210 is configured to present a CGR experience to the user 250 based on a gaze vector and a portion of reading content (e.g., text content and/or graphical content). In some implementations, the electronic device 210 corresponds to a mobile device, such as a mobile phone, laptop, tablet, etc.

As illustrated in FIG. 2A, the electronic device 210 includes a first image sensor 212 (e.g., a rear-facing camera) associated with a field-of-view 212a. The electronic device 210 is being held by the user 250 such that the first image sensor 212 is positioned towards a table 255 on which a book 260 lies. Accordingly, the first image sensor 212 obtains pass-through image data including first reading content 261a on an open page of the book 260. One of ordinary skill in the art will appreciate that the reading content may correspond to any combination of text content and graphical content on a physical medium (e.g., book, magazine, newspaper) or on an electronic medium. For example, in some implementations, the reading content corresponds to a combination of text content and image content displayed on a display of the electronic device 210, such as a webpage article or a pass-through image including reading content on a physical medium.

As further illustrated in FIG. 2A, the electronic device 210 includes a second image sensor 214 (e.g., a front-facing camera). The second image sensor 214 obtains a gaze vector that characterizes a sightline 230 based on eye tracking values, as is illustrated by line 214a (illustrated for explanatory purposes only). As will be discussed more below, in various implementations, the electronic device 210 identifies a portion of the first reading content 261a associated with a first region where the sightline 230 intersects a surface including the first reading content 261a (e.g., the book 260 or a display of the electronic device 210 including a pass-through image with the first reading content 261a), and presents one or more CGR representations corresponding to the portion of the reading content.

According to various implementations, as illustrated in FIGS. 2B-2E, a head-mountable device (HMD) 220 presents one or more CGR representations corresponding to a first portion 262a of the first reading content 261a. In some implementations, as illustrated in FIG. 2B, a second operating environment 202 includes the HMD 220 in a second physical environment 206 and the controller 204. In some implementations, the controller 204 is a computing device that is local or remote relative to the second physical environment 206. For example, the controller 204 is a local server located within the second physical environment 206. In another example, the controller 204 is a remote server located outside of the second physical environment 206 (e.g., a cloud server, central server, etc.). In some implementations, the controller 204 is integrated within the HMD 220. In some implementations, the controller 204 is communicatively coupled with the HMD 220 via one or more wired or wireless communication channels 245 (e.g., BLUETOOTH, IEEE 802.11x, IEEE 802.16x, IEEE 802.3x, etc.).

Referring to FIG. 2B, the HMD 220, being worn by the user 250, presents (e.g., displays) a CGR environment according to various implementations. In some implementations, the HMD 220 includes an integrated display (e.g., a built-in display) that displays the CGR environment. In some implementations, the HMD 220 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 210). For example, in some implementations, the electronic device 210 slides/snaps into or otherwise attaches to the head-mountable enclosure. In some implementations, the display of the device attached to the head-mountable enclosure presents (e.g., displays) the CGR environment. For example, in some implementations, the electronic device 210 corresponds to a mobile phone that can be attached to the head-mountable enclosure. In various implementations, examples of the electronic device 210 include smartphones, tablets, media players, laptops, etc.

According to some implementations, the HMD 220 presents a CGR experience to the user 250 while the user 250 is virtually and/or physically present within the second physical environment 206 that includes one or more physical objects, such as the table 255 and book 260 in FIG. 2B.

As illustrated in FIG. 2B, the HMD 220 includes an image sensor 222 associated with a field-of-view 222a. The HMD 220 is being worn by the user 250 such that the image sensor 220 is positioned towards the table 255 on which the book 260 lies. Accordingly, the image sensor 222 obtains pass-through image data including the first reading content 261a on an open page of the book 260. One of ordinary skill in the art will appreciate that the reading content may correspond to any combination of text content and image content on a physical medium (e.g., book, magazine, newspaper) or on an electronic medium. For example, in some implementations, the reading content corresponds to a combination of text content and image content displayed on a display of the electronic device 210, such as a webpage article being displayed on a display panel integrated within the HMD 220 or a pass-through image including reading content on a physical medium.

The HMD 220 further includes an eye tracking sensor 224. The eye tracking sensor 224 obtains a gaze vector that characterizes a sightline 230 based on eye tracking values. In some implementations, the eye tracking sensor 224 includes (e.g., has integrated within) one or more of an event camera, an eye tracking camera, and a depth camera. For example, an event camera performs pre-processing of the visual information directly at the sensor plane, and the event camera includes bio-inspired vision sensors that output pixel-level brightness changes instead of standard intensity frames. As another example, an eye tracking camera is directed towards one or more eyes of the user 250 in order to determine a gaze direction of the user 250.

As illustrated in FIG. 2C, the HMD 220 identifies, from the pass-through image data and the sightline 230, a first portion 262a of the first reading content 261a associated with a first region 270a where the sightline 230 intersects a surface including the first reading content 261a. In some implementations, the surface corresponds to an outer portion of a planar object, such as a region of a top of table. In some implementations, the surface corresponds to an outer portion of a non-planar object, such as a region of a folded newspaper. In some implementations, the first region 270a corresponds to a focus point, focus area, point of regard, gaze point, or gaze target of the user 250.

As illustrated in FIG. 2D, the first reading content 261a corresponds to a story entitled "Blue the Dog." The first portion 262a of the first reading content 261a includes an end portion of a particular sentence and a beginning portion of a subsequent sentence. In various implementations, the HMD 220 obtains (e.g., identifies) certain subsets of the first reading content 261a associated with the first portion 262a of the first reading content 261a and presents CGR representations based on the certain subsets. For example, as illustrated in FIG. 2D, the HMD 220 obtains a first subset 263 ("sunny day"), a second subset 264 ("very tall tree"), and third subset 265 ("began walking") of the first reading content 261a. In some implementations, the HMD 220 obtains one or more subsets from a predetermined list of content. In some implementations, the HMD 220 identifies one or more subsets of reading content using optical character recognition (OCR). In some implementations, in response to determining that the first portion 262a of the first reading content 261a satisfies one or more presentation criteria, the HMD 220 presents one or more CGR representations corresponding to the first portion 262a of the first reading content 261a. For example, the first portion 262a satisfies one or more presentation criteria because the first portion 262a corresponds to an end of a sentence in which an action occurs (e.g., "began walking towards it"). In some implementations, the HMD 220 identifies companion content 266 of the first portion 262a, wherein the companion content 266 corresponds to a sentence directly before the first portion 262a. The HMD 220 may utilize the companion content 266 in determining the one or more CGR representations.

As illustrated in FIG. 2E, the HMD 220 presents, on a display 226, CGR representations of a dog 227a walking towards a tall tree 227c on a sunny day 227b. In some implementations, the CGR representations are based on the first subset 263, the second subset 264, the third subset 265, the companion content 266, or a combination thereof. In some implementations, the display 226 displays the CGR representations and pass-through image data. For example, in some implementations, as illustrated in FIG. 2E, the CGR representations are overlaid on physical objects, such as the dog 227a walking across the physical (e.g., real-world) table 255 included within the pass-through image data. In some implementations, the HMD 220 presents the CGR representations independent of pass-through image data.

According to various implementations, as illustrated in FIGS. 2F-2M, the HMD 220 presents one or more CGR representations in response to determining that the sightline 230 moves outside of second reading content 261b. As illustrated in FIGS. 2F and 2G, the HMD 220 identifies, from the pass-through image data and the sightline 230, a second portion 262b of the second reading content 261b associated with a first region 270b where the sightline 230 intersects a surface including the second reading content 261b. As illustrated in FIG. 2H, the second reading content 261b corresponds to a "Reading comprehension test" associated with the first reading content 261a, the "Blue the Dog" story. The second portion 262b of the second reading content 261b corresponds to "mischievous," the last word of the first question of the "Reading comprehension test."

Notably, in contrast to the example described above with reference to FIG. 2B-2E, the HMD 220 does not present CGR representations in response to identifying the second portion 262b of the second reading content 261b. Namely, as illustrated in FIG. 2I, while displaying the pass-through image data including the table 255, the HMD 220 does not present CGR representations corresponding to the second portion 262b.

Instead, as illustrated in FIGS. 2J-2M, in response to determining, based on the pass-through image data and the sightline 230, a third region 270c that is outside of the second reading content 261b, the HMD 220 presents CGR representations. As illustrated in FIGS. 2J and 2K, the HMD 220 identifies, from the pass-through image data and the sightline 230, the third region 270c that is outside of the second reading content 261b. As illustrated in FIG. 2L, the third region 270c is a distance 280 away from companion content 267 that is associated with the second portion 262b of the second reading content 261b. The companion content 267 corresponds to the first question of the "Reading comprehension test." In some implementations, the companion content 267 includes the second portion 262b of the second reading content 261b because the companion content 267 and the second portion 262b are included within the first question of the "Reading comprehension test." In some implementations, the companion content 267 does not include the second portion 262b of the second reading content 261b and instead includes related portions of the second reading content 261b, such as nearby reading content or reading content pertaining to the same topic.

As illustrated in FIG. 2M, the HMD 220 presents the CGR representations of the dog 227a walking towards the tall tree 227b on the sunny day 227c. In this way, the HMD 220 provides CGR-based assistance in answering the question when the user 250 may be looking away from the second reading content 261b in contemplation of the answer. In some implementations, referring back to FIG. 2L, the HMD 220 presents the CGR representations in response to determining that the distance 280 between the third region 270c and the companion content 267 satisfies a distance threshold. In some implementations, the HMD 220 presents the CGR representations in response to determining that the third region 270c is outside of the second reading content 261b for a first threshold amount of time, but not for a second threshold amount of time that is greater than the first threshold amount of time.

According to various implementations, as illustrated in FIGS. 2N-2P, the HMD 220 presents a virtual mind's eye view including CGR representations. As illustrated in FIG. 2N, the HMD identifies from pass-through image data and a sightline characterized by a gaze vector a portion 283a of reading content 282 associated with a first region 270d where the sightline intersects a surface. The reading content 282 corresponds to a "Chemistry Quiz" within a medium 280 (e.g., a Chemistry textbook). The portion 283a of reading content 282 corresponds to the end of the companion content 286 of the "Chemistry Quiz." The HMD 220 may obtain (e.g., identify) a first subset 284 ("ethane") of the reading content 282 and a second subset 285 ("propane") of the reading content 282. The HMD 220 may further obtain (e.g., identify) companion content 286 associated with the portion 283a of reading content 282.

As illustrated in FIGS. 2N and 2O, based on a determined change to the sightline, the HMD 220 determines a change from the first region 270d to a second region 270e. Notably, the second region 270e is outside of an area bounded by the reading content 282. The second region 270e is a distance 288 away from the companion content 286.

As illustrated in FIG. 2P, in response to determining the change from the first region 270d to the second region 270e, the HMD 220 presents a first CGR representation 290 (e.g., chemical diagram of ethane) corresponding to the first subset 284 and a second CGR representation 292 (e.g., chemical diagram of propane) corresponding to the second subset 285. In this way, the HMD 220 provides CGR-based assistance in answering the question when the user 250 may be looking away from the second reading content 261b in contemplation of the answer. In some implementations, referring back to FIG. 2O, the HMD 220 presents the CGR representations in response to determining that the distance 288 between the second region 270e and the companion content 286 satisfies a distance threshold. In some implementations, the HMD 220 presents the first and second CGR representations 290 and 292 in response to determining that the second region 270e is outside of an area bounded by the reading content 282 for a threshold amount of time.

Figure 3A:
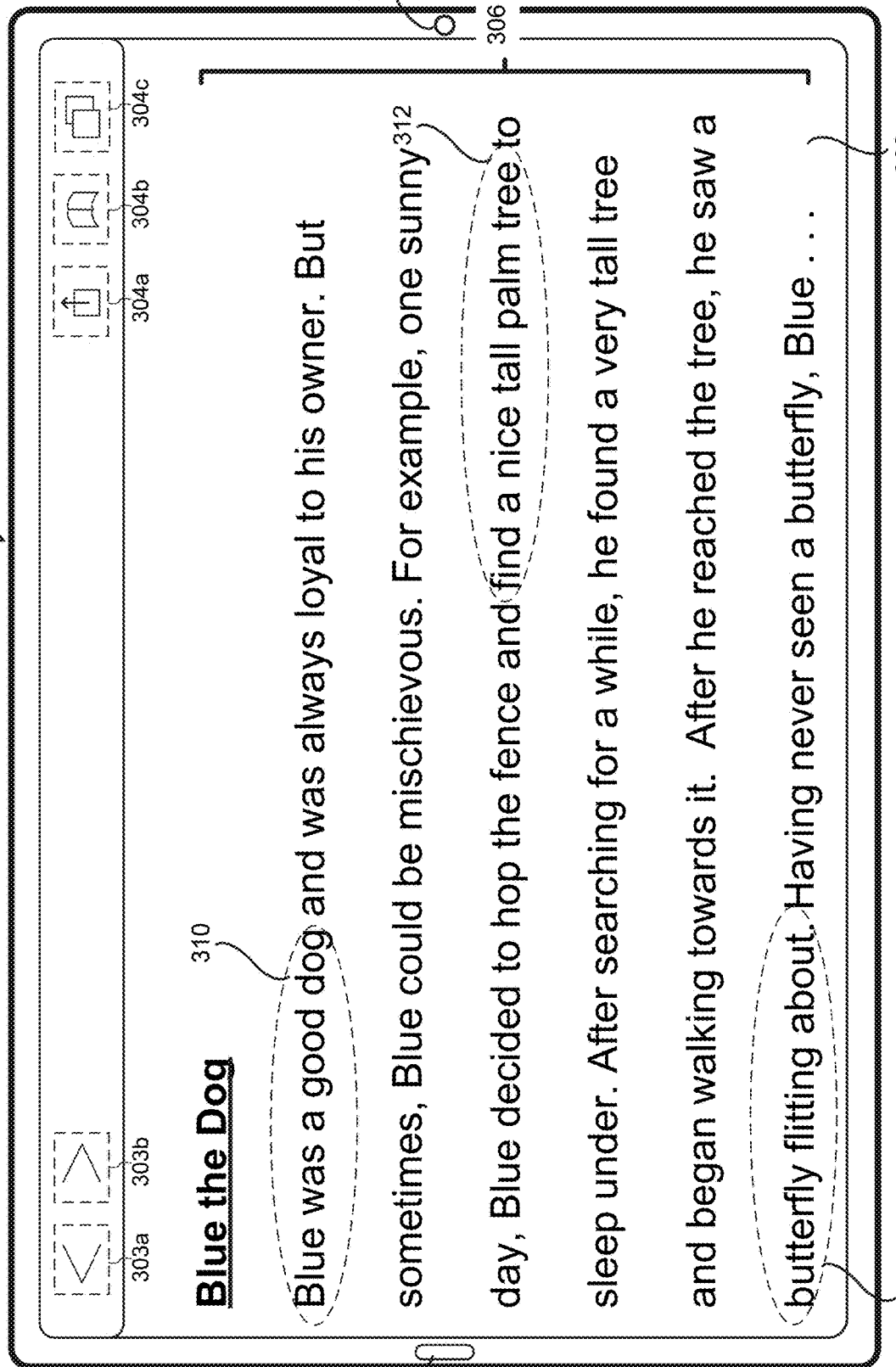
FIGS. 3A-3T are examples of presenting CGR representations based on a positional change input in accordance with some implementations.
Figure 3B:
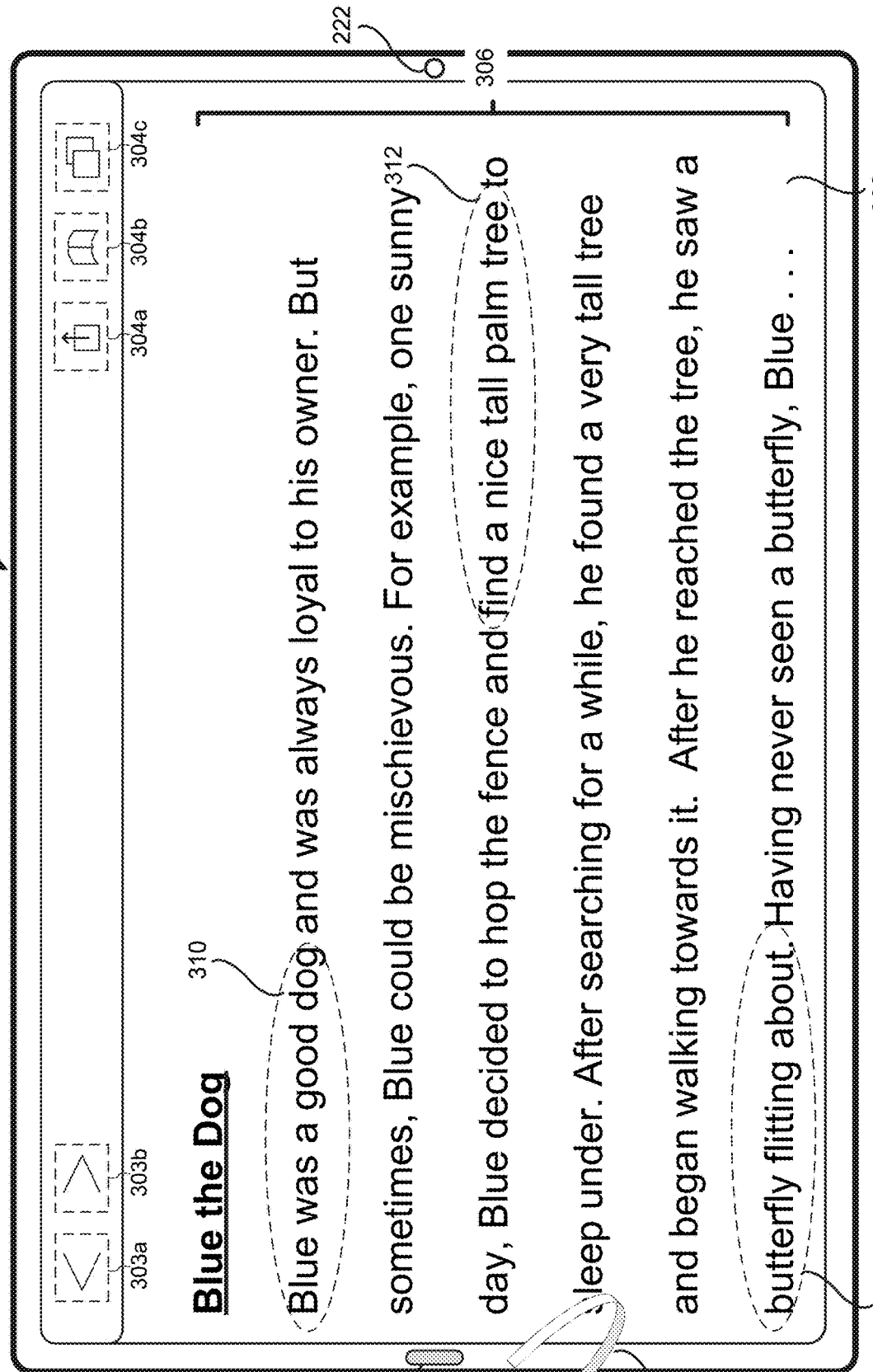
Figure 3C:
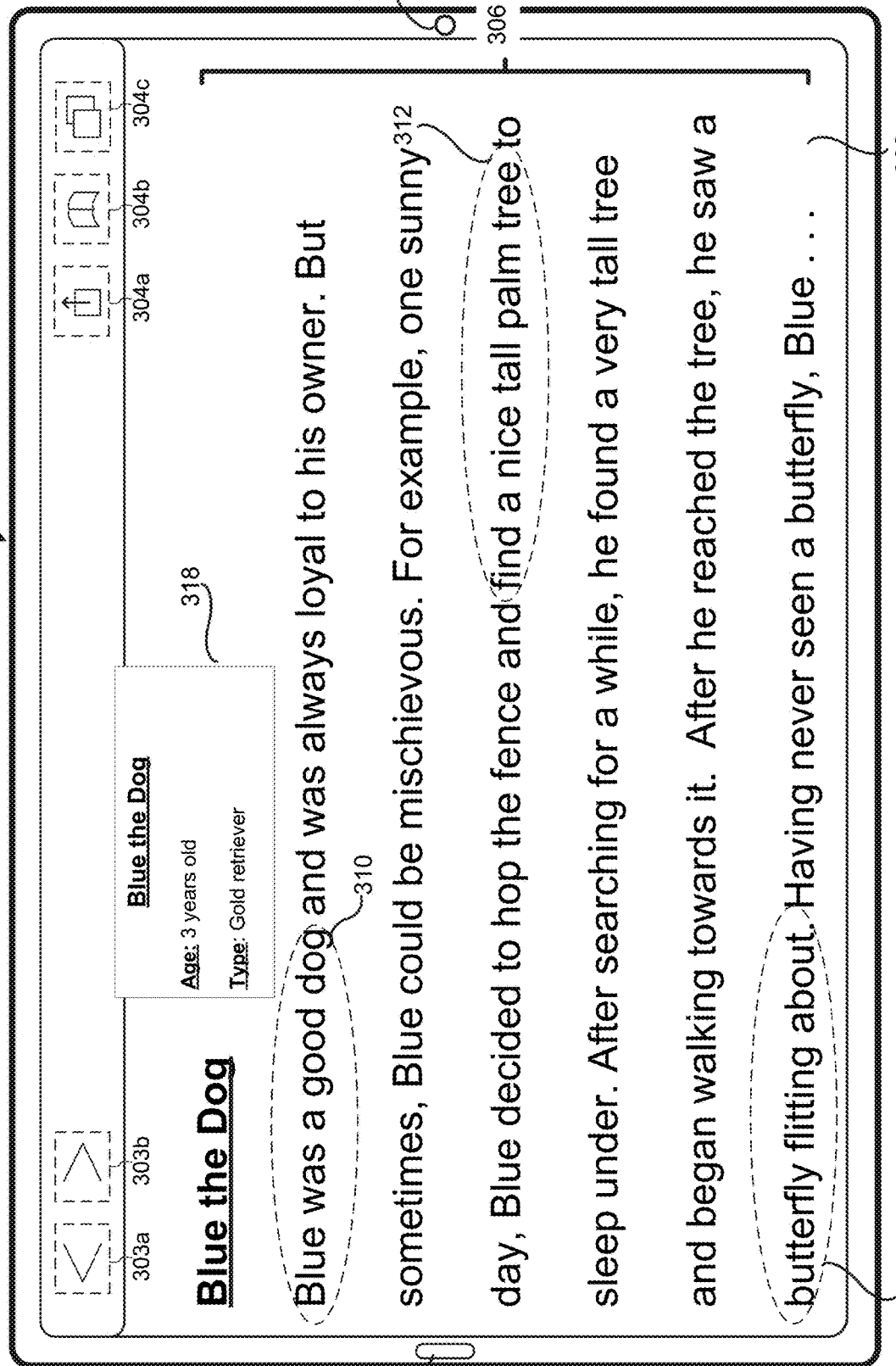
Figure 3D:
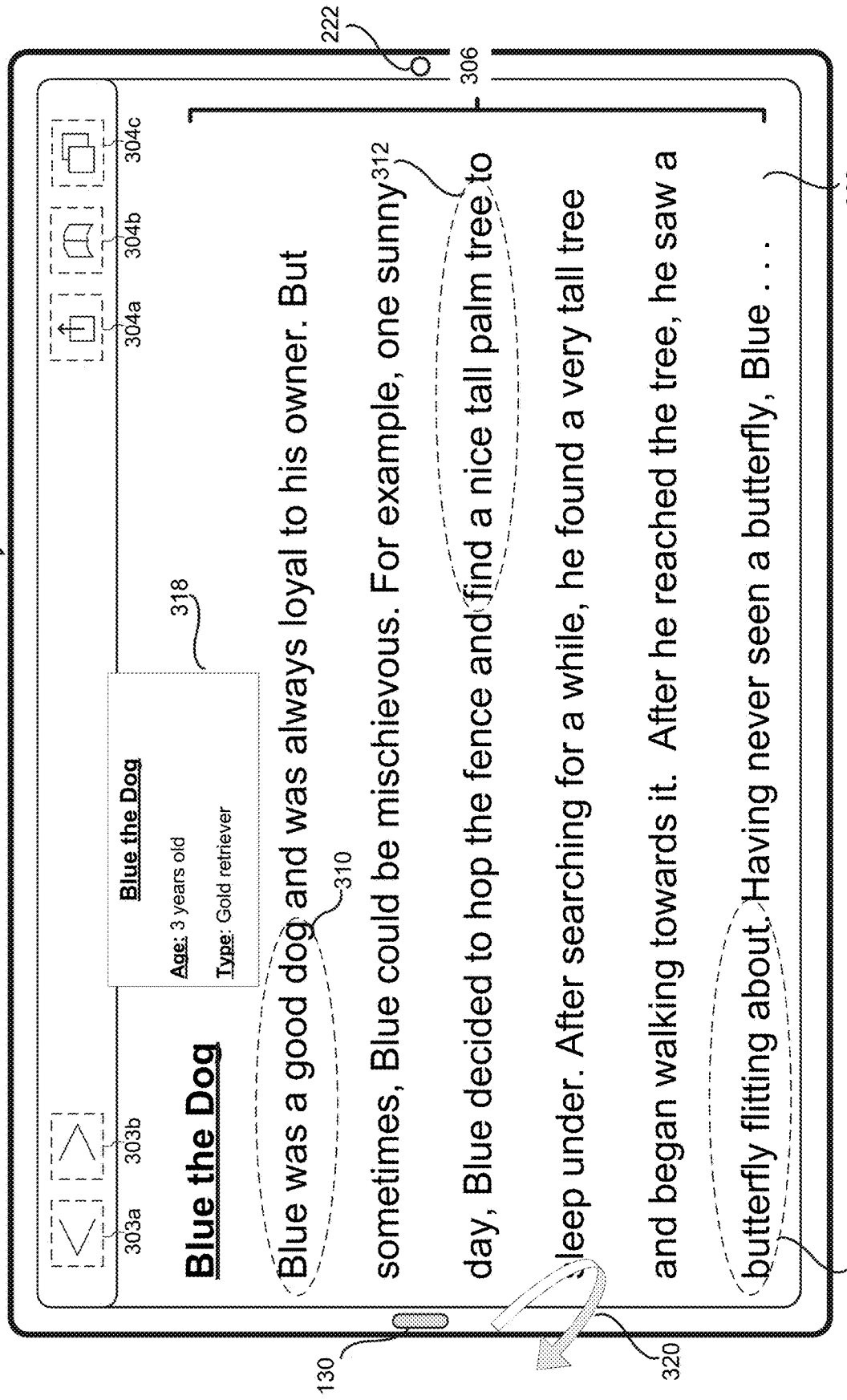
Figure 3E:
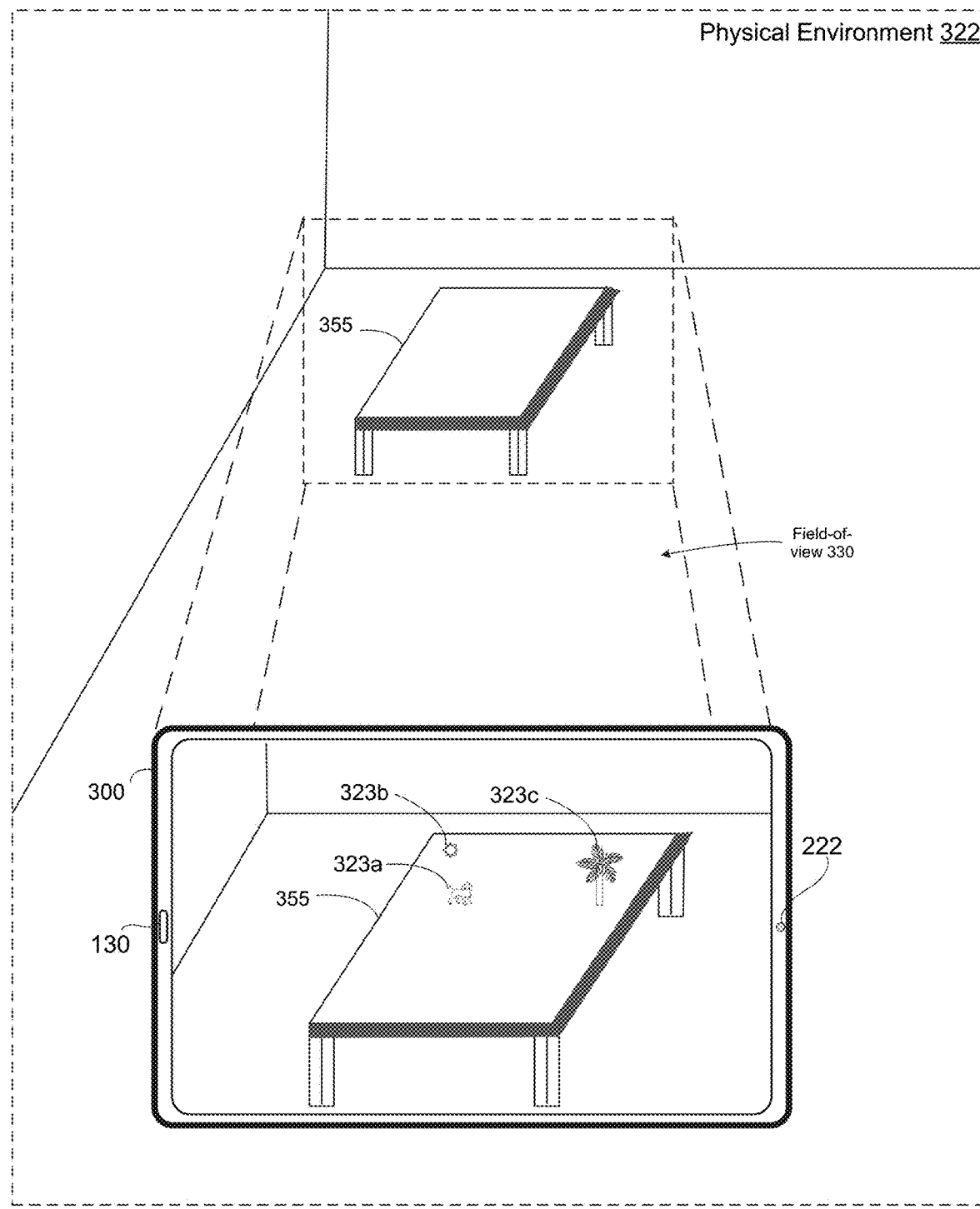
Figure 3F:
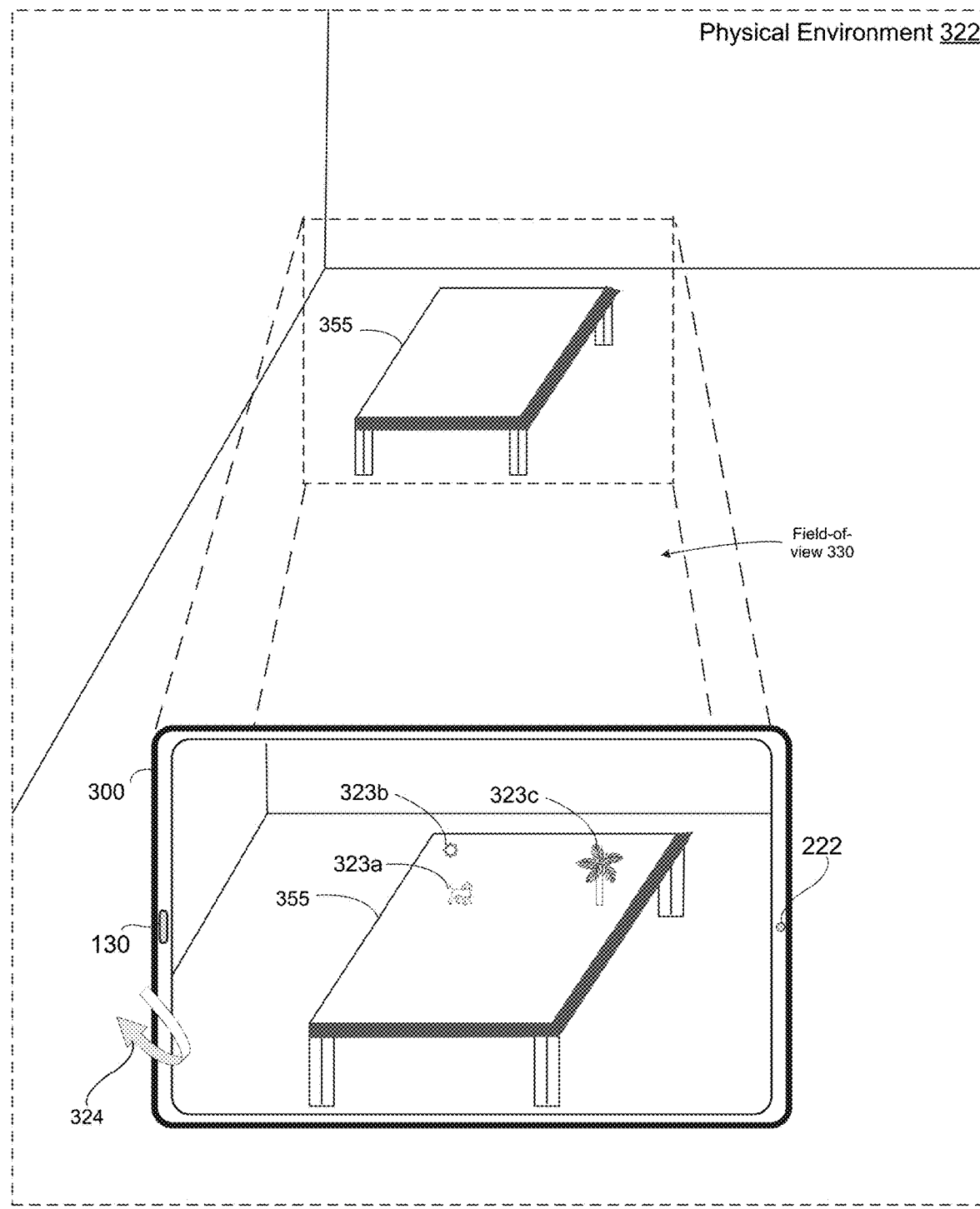
Figure 3G:
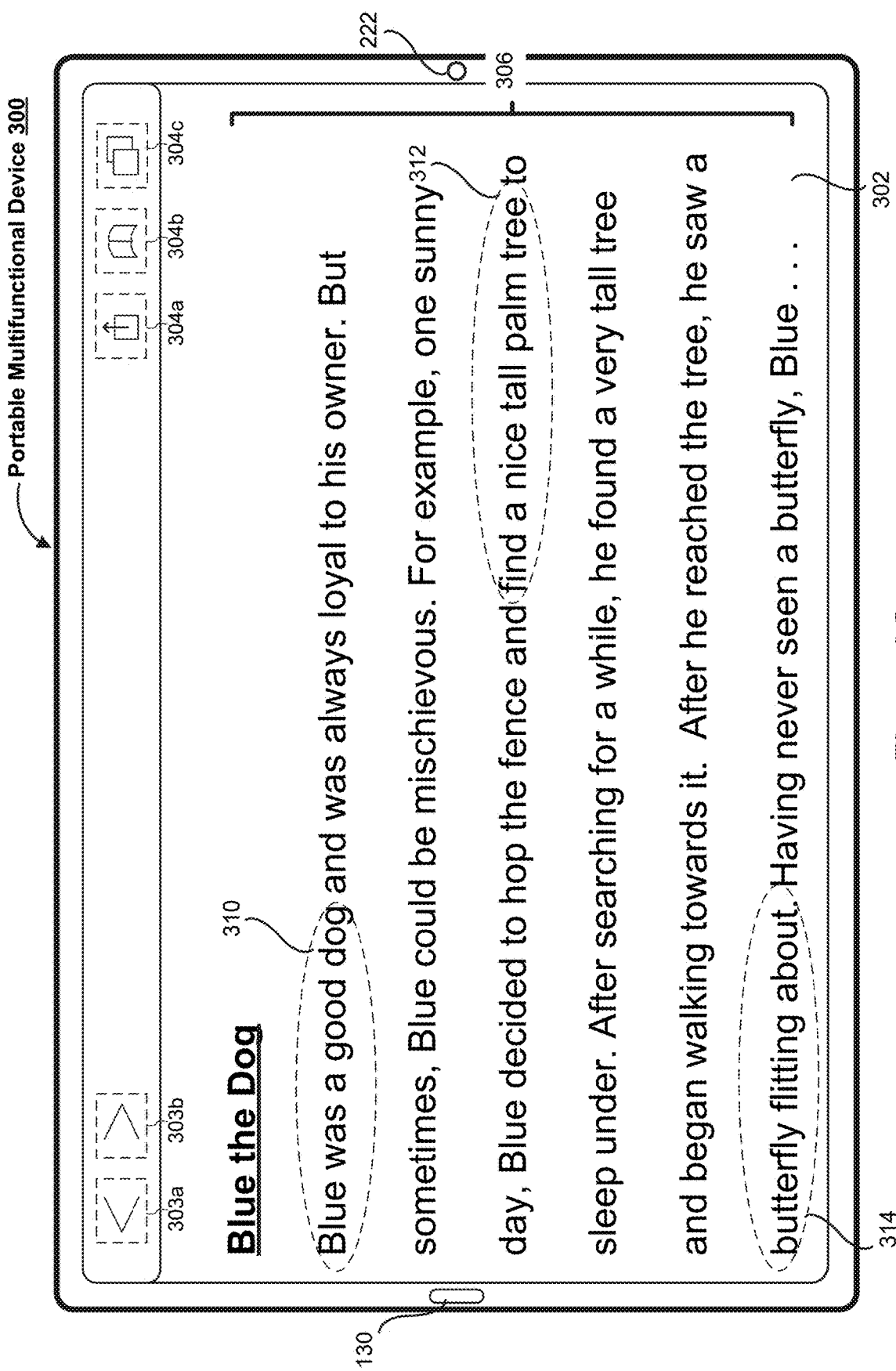
Figure 3H:
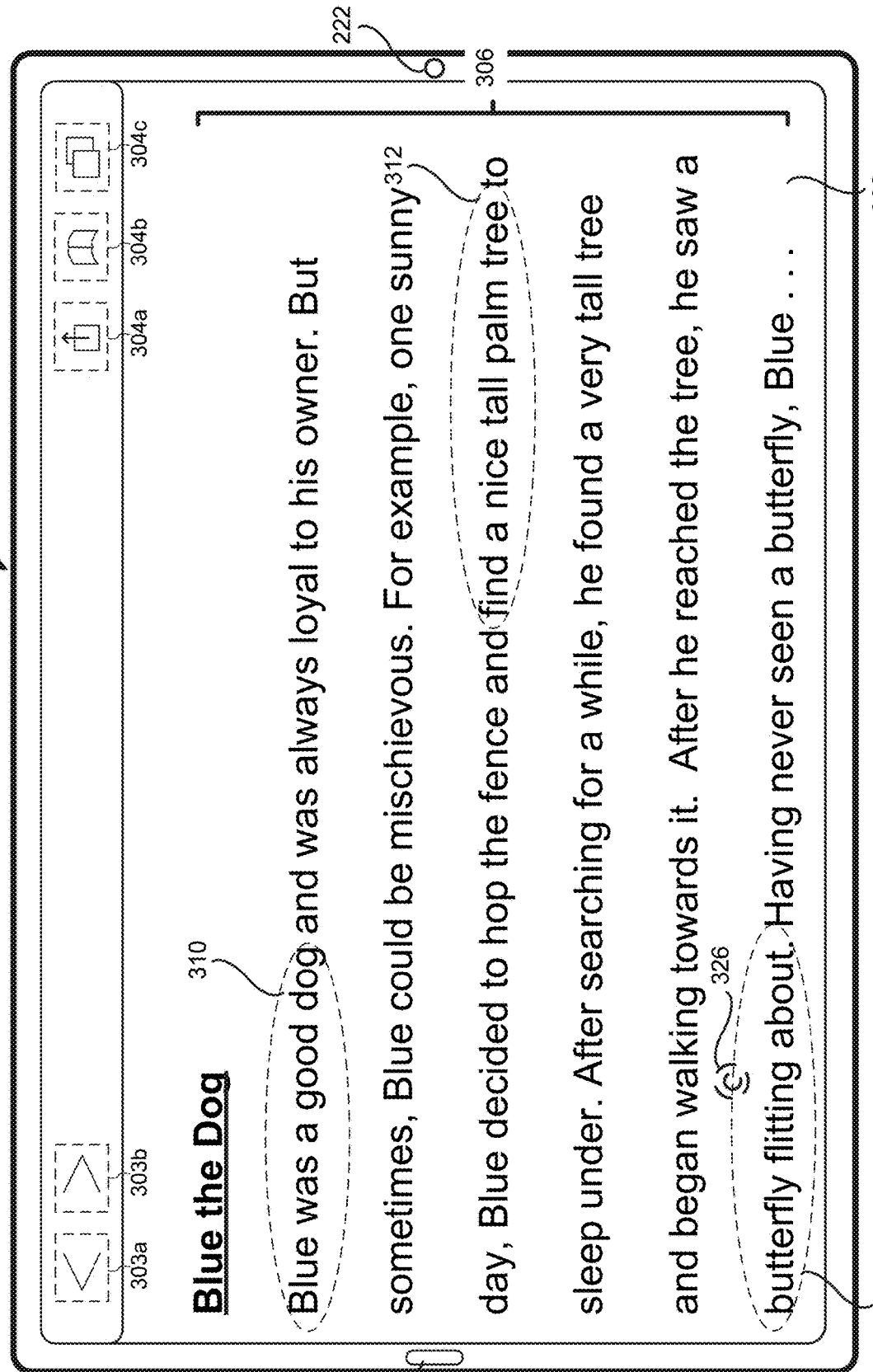
Figure 3I:
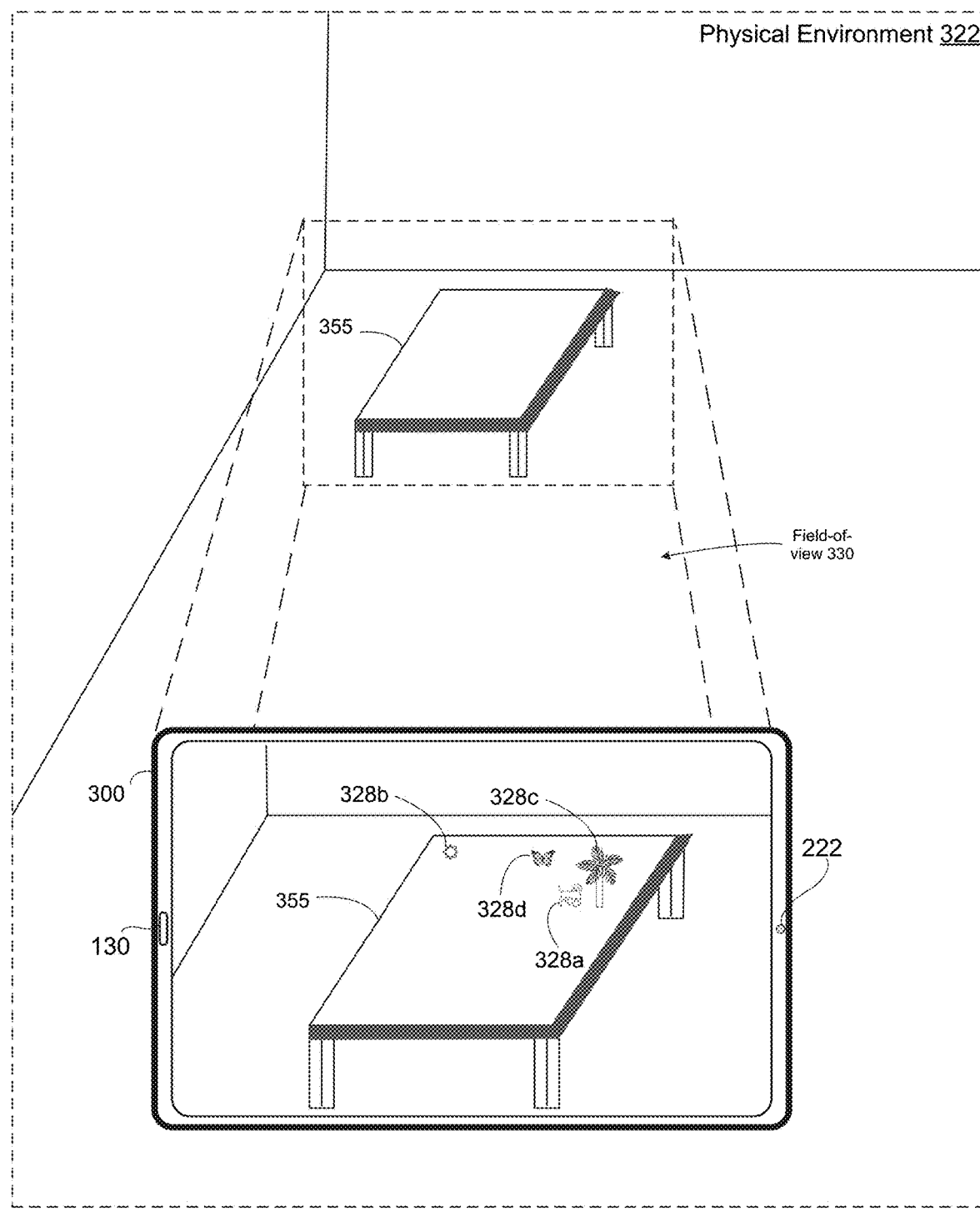
Figure 3J:
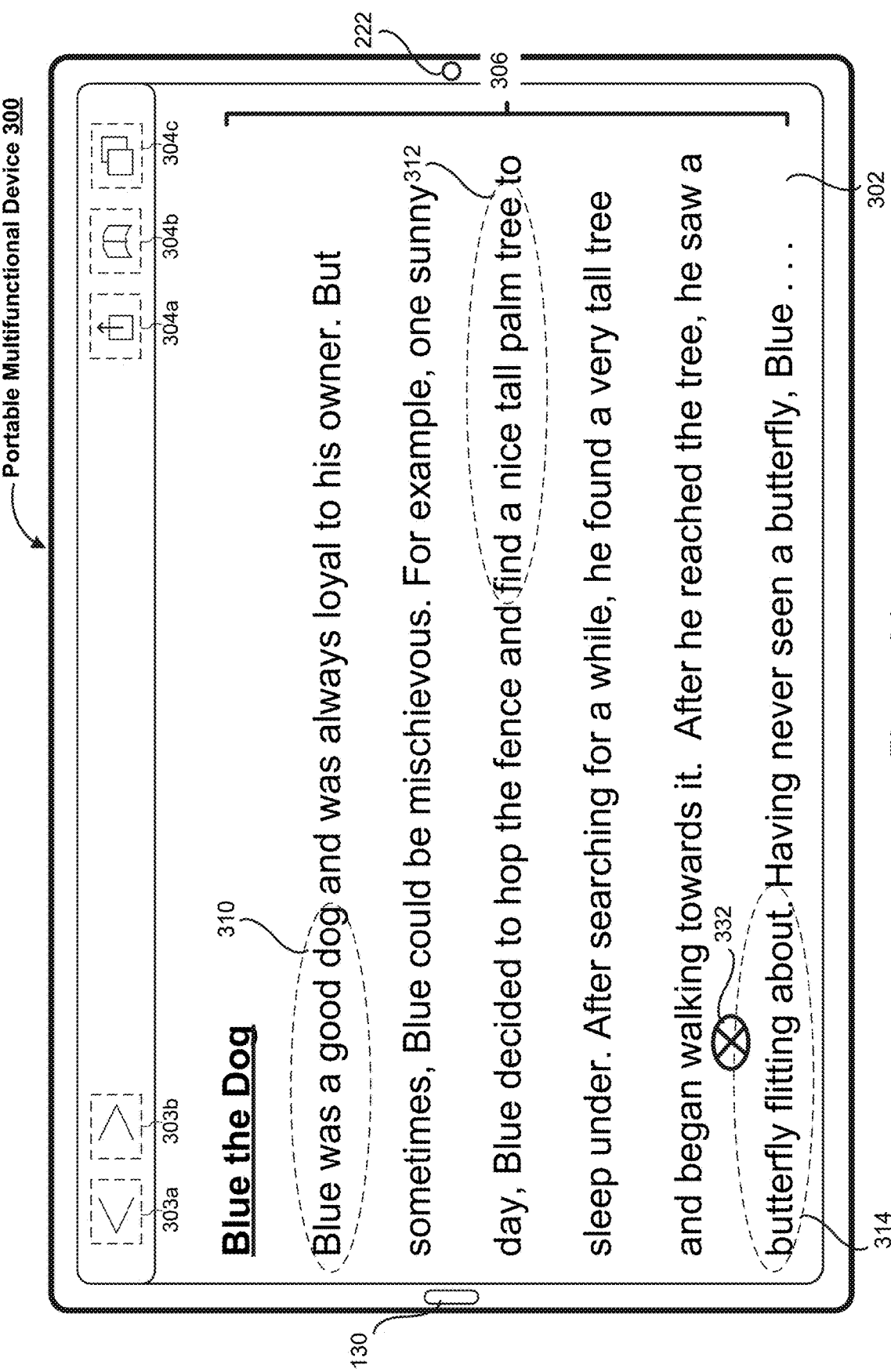
Figure 3K:
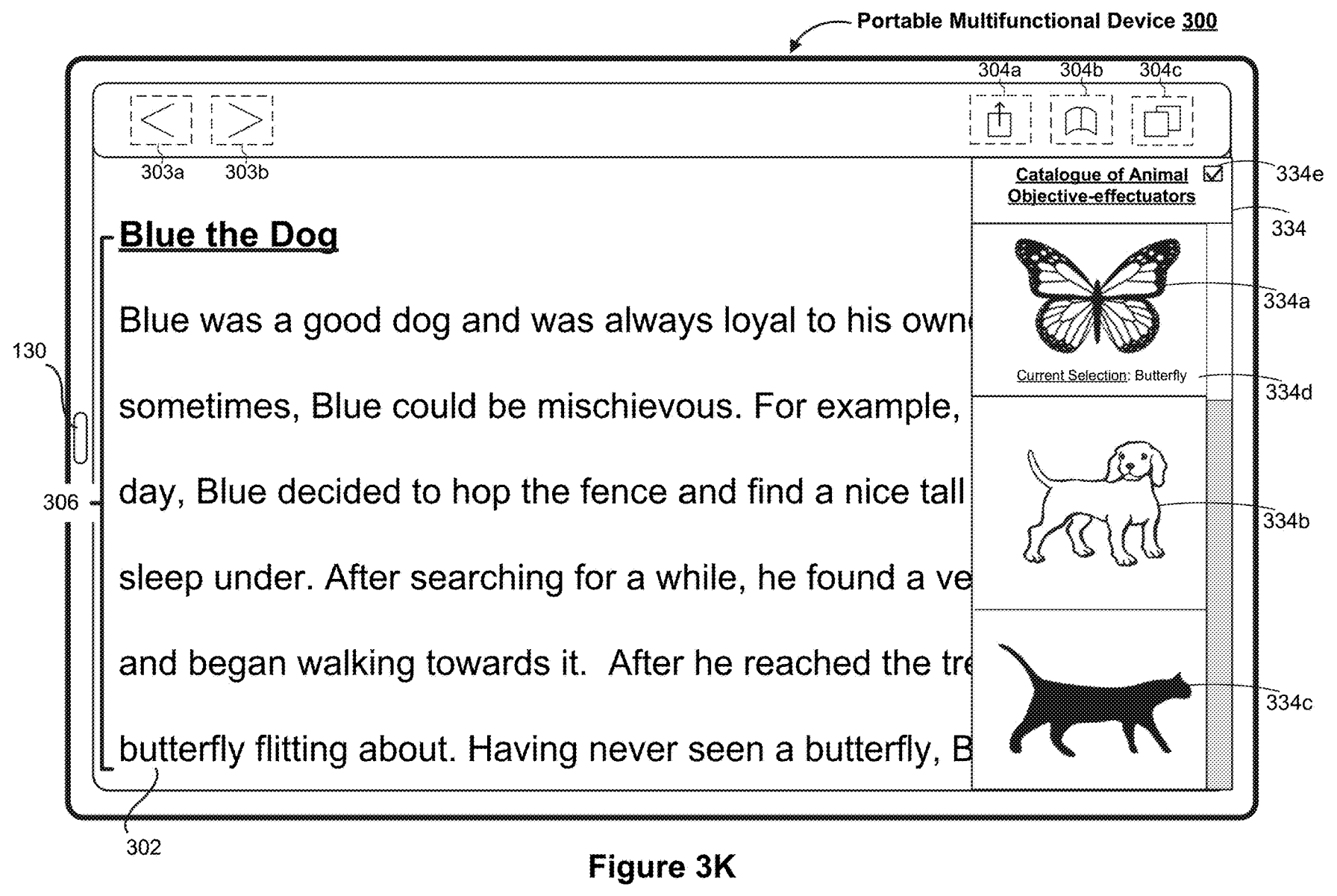
Figure 3M:
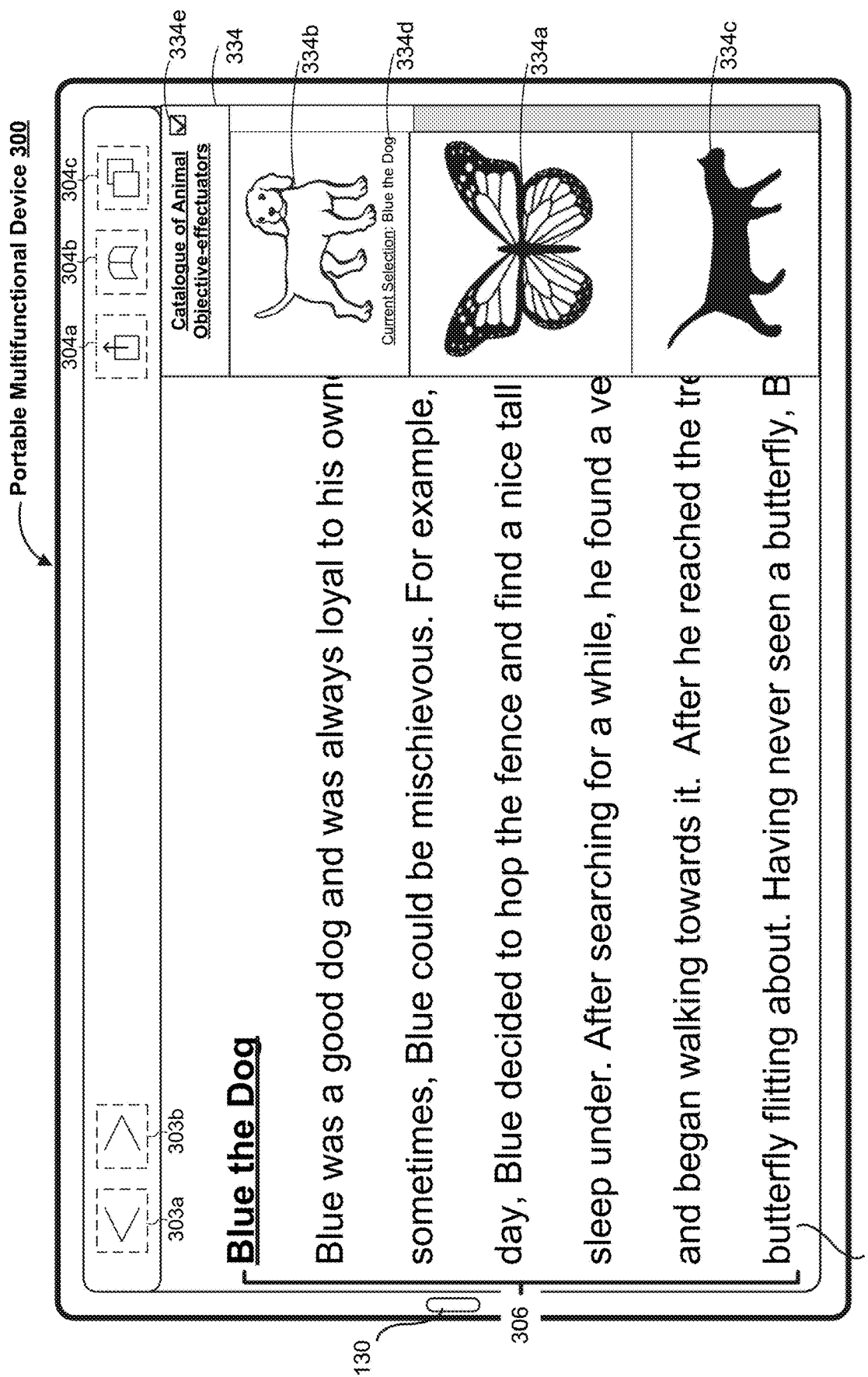
Figure 3N:
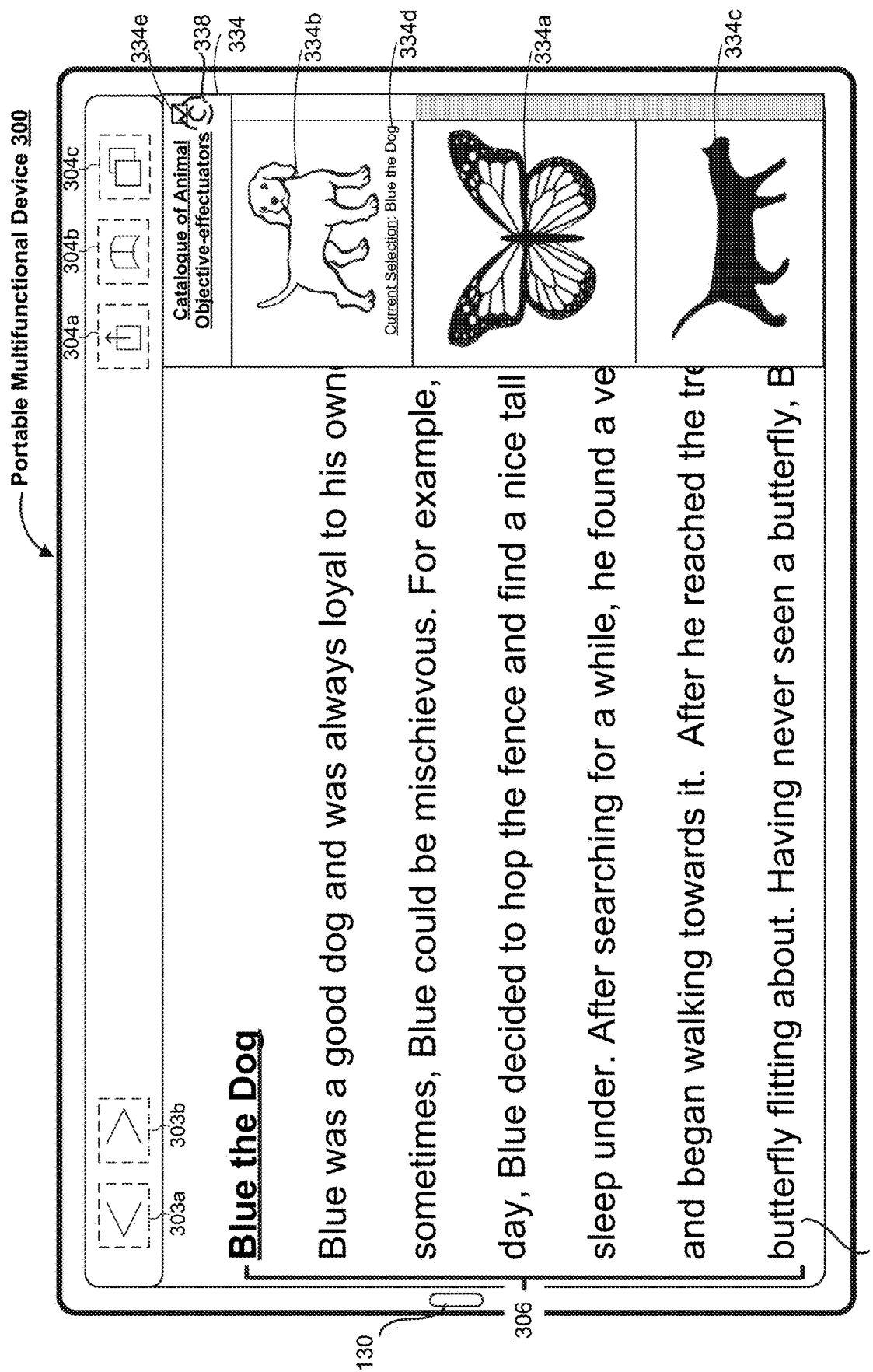
Figure 3O:
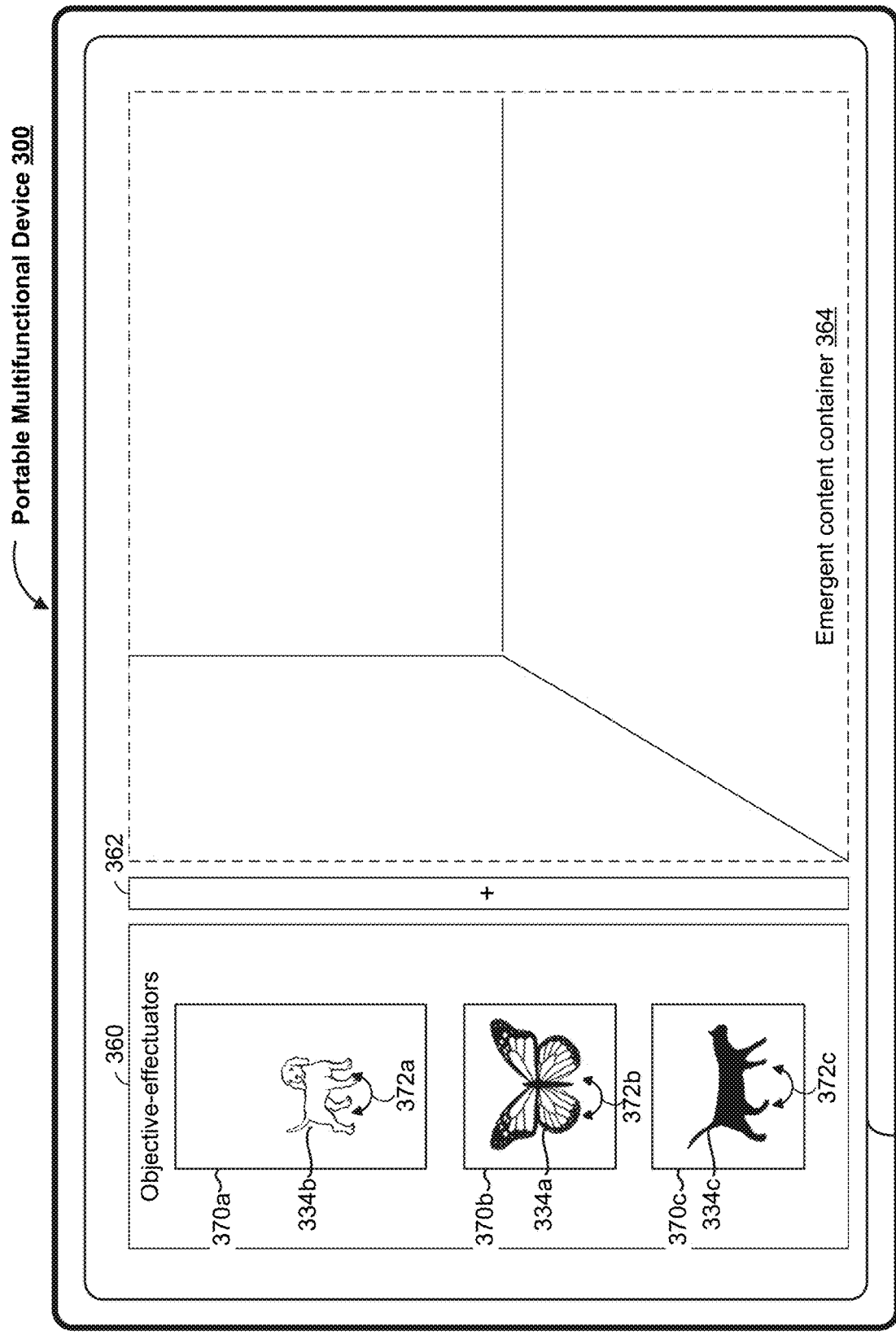
Figure 3P:
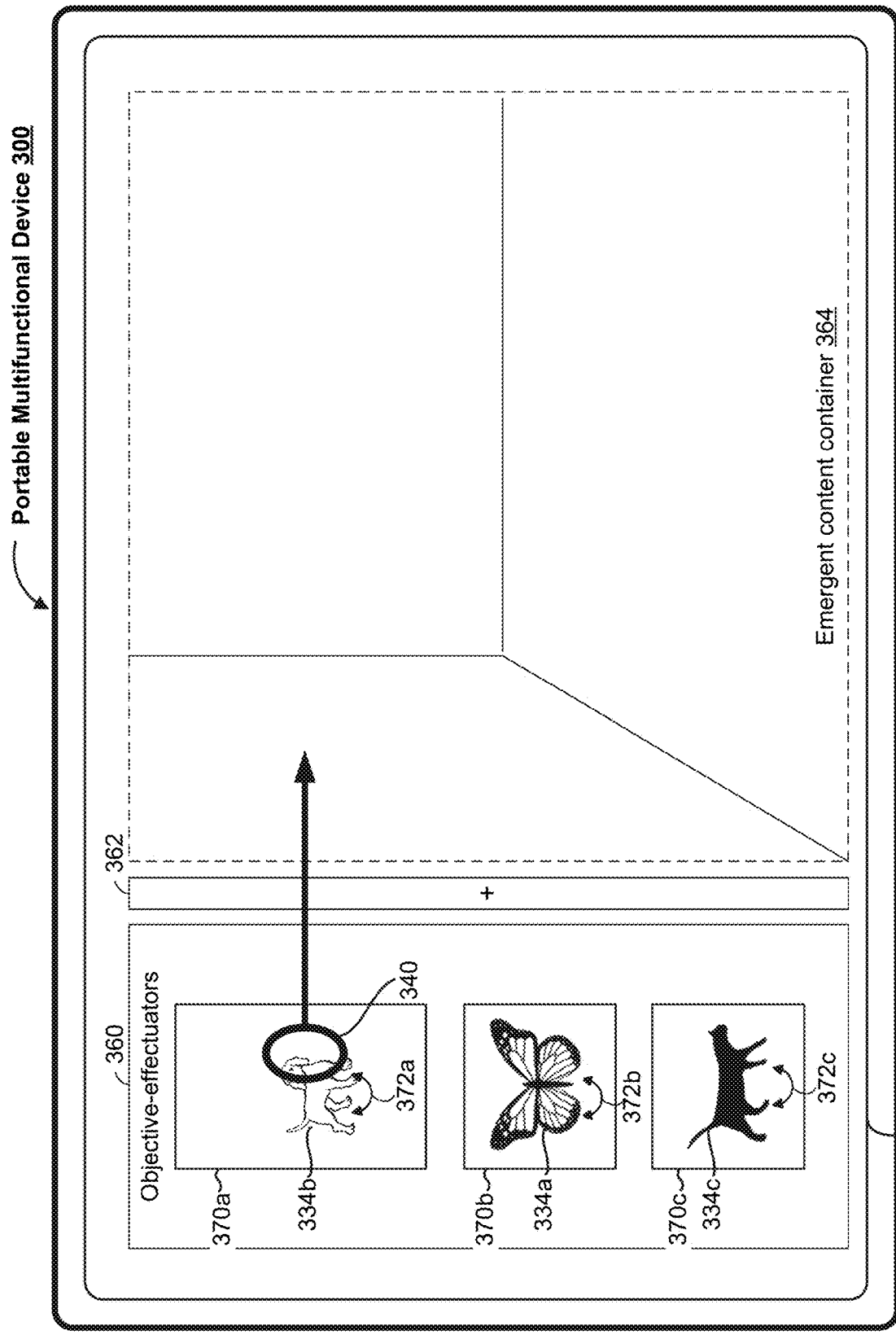
Figure 3Q:
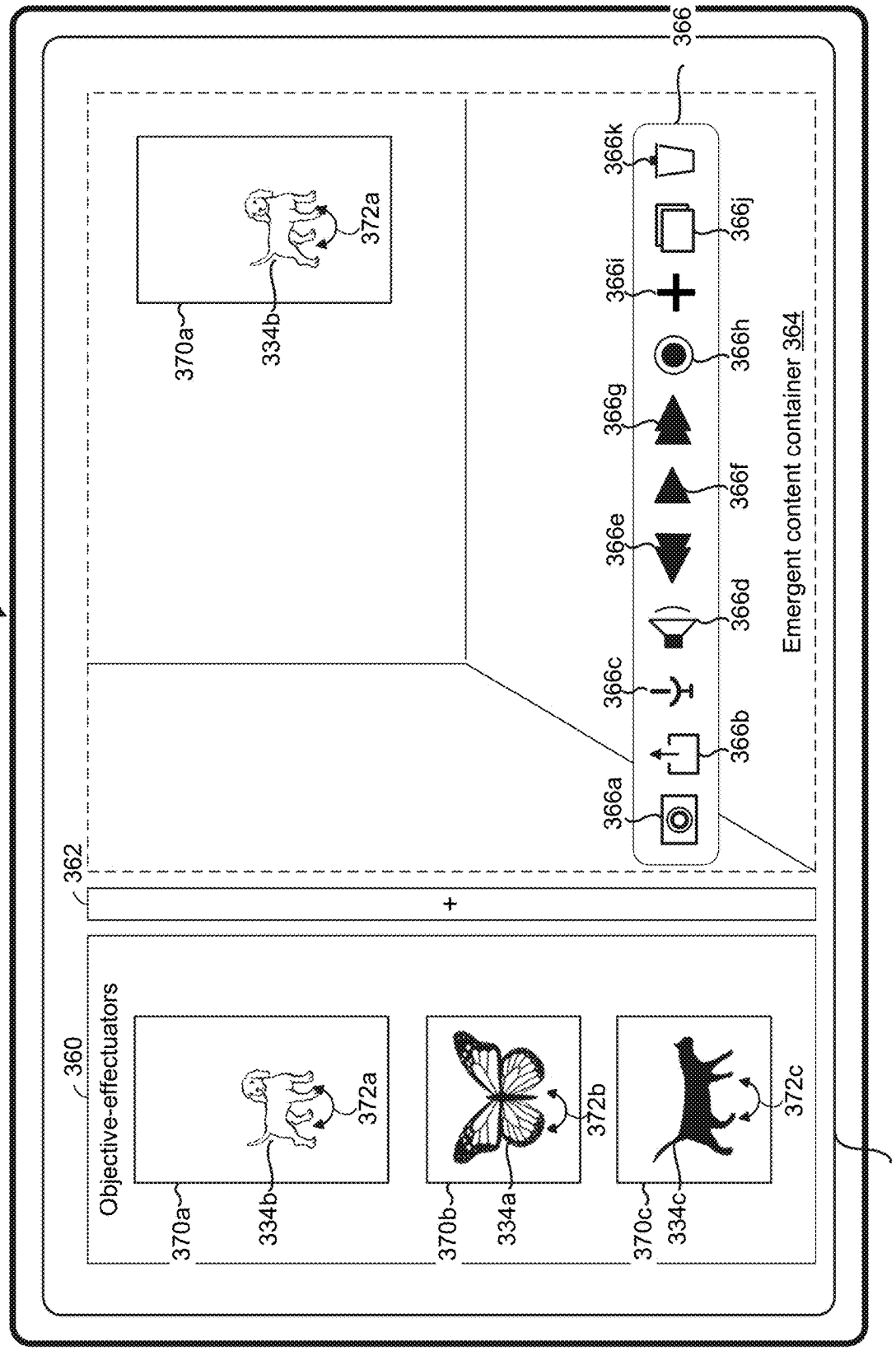
Figure 3R:
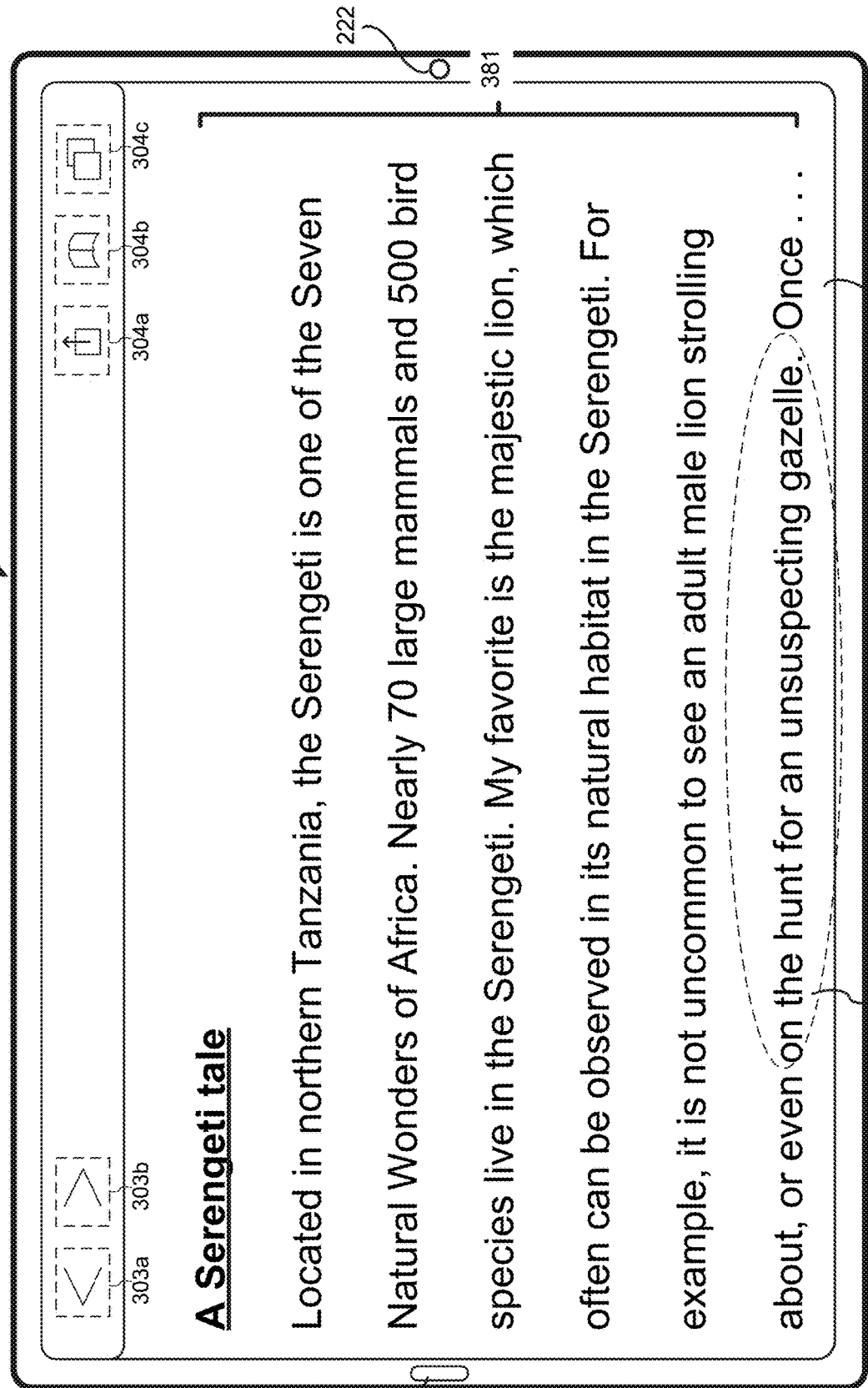
Figure 3S:
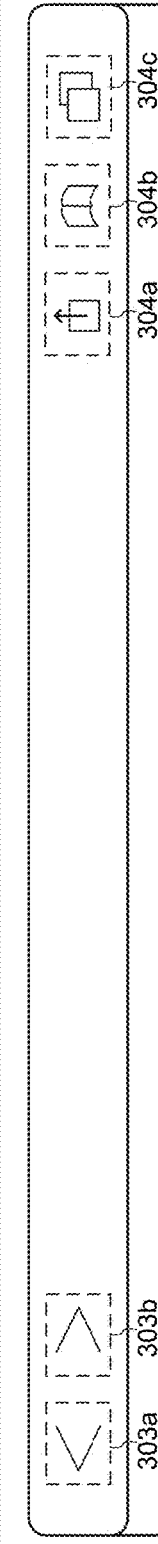
Figure 3T:
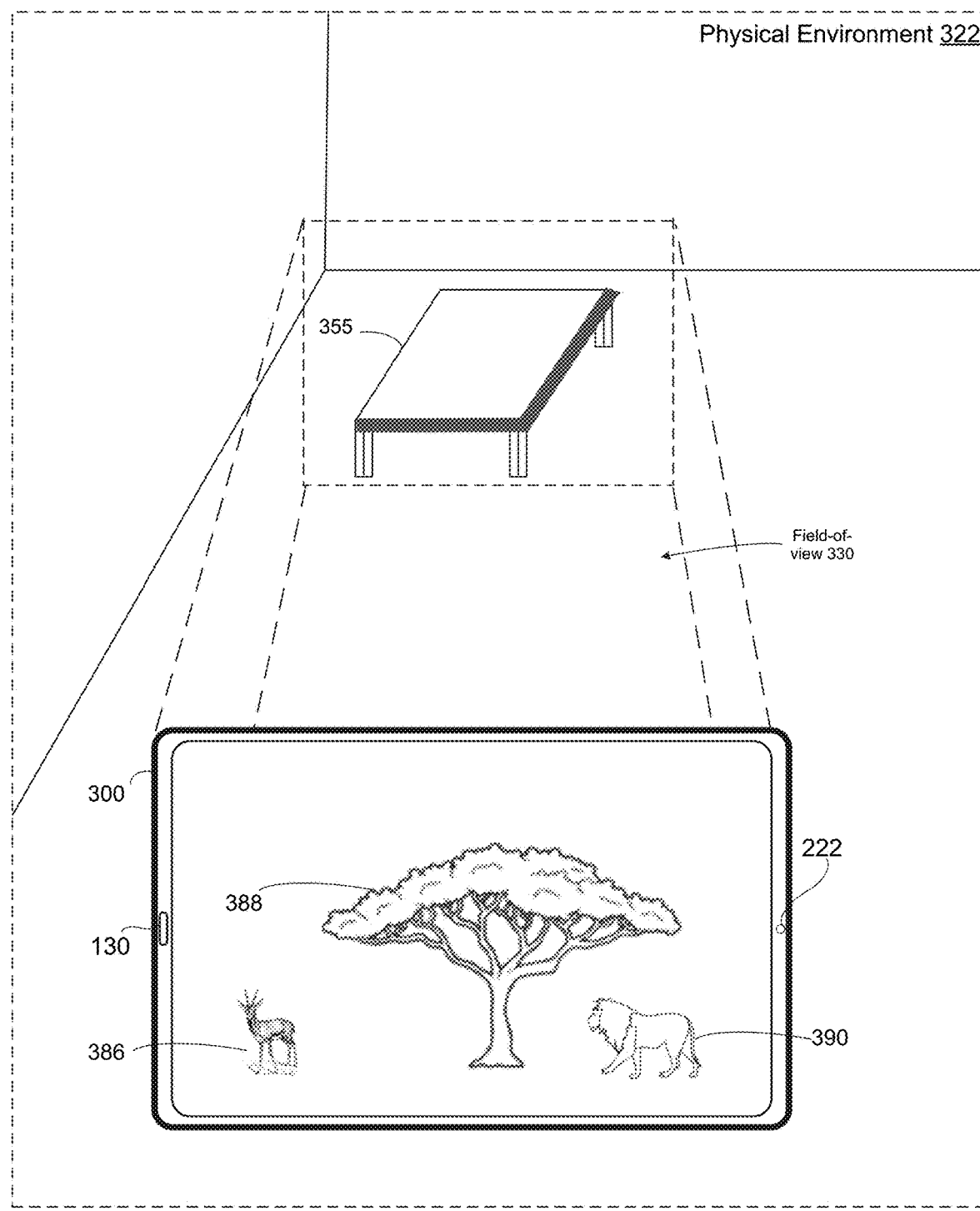

FIGS. 3A-3T are examples of presenting CGR representations based on a positional change input according to some implementations. As illustrated in FIG. 3A, a portable multifunction device 300 (sometimes hereinafter "the electronic device 300") displays a reader interface 302 including reading content 306, a back affordance 303a, a forward affordance 303b, a share affordance 304a, a bookmarks affordance 304b, and a tabs affordance 304c. One of ordinary skill in the art will appreciate that the reading content 306 may include any type and/or variety of content, such as text, images, etc. In some implementations, the electronic device 300 corresponds to the electronic device 210 in FIG. 2A. In some implementations, the electronic device 300 corresponds to the HMD 220 in FIG. 2B.

As further illustrated in FIG. 3A, the electronic device 300 displays a first reading content indicator 310 corresponding to a first portion (e.g. "Blue was a good dog") of the reading content 306, a second reading content indicator 312 corresponding to a second portion (e.g. "find a nice palm tree") of the reading content 306, and a third reading content indicator 314 corresponding to a third portion (e.g. "butterfly flitting about") of the reading content 306. In some implementations, the electronic device 300 identifies one or more portions of the reading content 306 by utilizing optical character recognition (OCR). In some implementations, a particular reading content indicator corresponds to an affordance. In some implementations, a particular reading content indicator corresponds to a combination of one or more visual indicators, one or more audio indicators, or one or more haptic indicators.

As illustrated in FIG. 3B, the electronic device 300 detects a first positional change input 316. The first positional change input 316 is indicative of the electronic device 300 changing from a first position to a second position. As illustrated in FIG. 3B, in some implementations, an inertial measurement unit (IMU) 130 of the electronic device 300 detects the first positional change input 316. In some implementations, a GPS sensor of the electronic device 300 detects the first positional change input 316.

In some implementations, a positional change input corresponds to changing the orientation of the electronic device 300, such as shaking or rotating the electronic device 300. In some implementations, a positional change input is detected when the electronic device 300 is moved towards (e.g., in the direction of) a physical object within a physical environment, such as the table 355 in a physical environment 322 in FIG. 3E. In some implementations wherein the electronic device 300 corresponds to an HMD being worn by a user, the HMD detects a positional change input resulting from movement of the head of the user, such as the user moving her head (e.g., shaking, rotating, or nodding her head) or by the user moving her entire body (e.g., walking).

In response to detecting the first positional change input 316 in FIG. 3B, the electronic device 300 displays a first CGR representation 318 within the reader interface 302 in FIG. 3C. The first CGR representation 318 is associated with the first portion (e.g. "Blue was a good dog") of the reading content 306. Namely, the first CGR representation 318 includes information about "Blue the Dog" because the corresponding first portion corresponds to "Blue was a good dog." In some implementations, the first CGR representation 318 includes information included within an earlier portion of the reading content 306 and/or includes predetermined information (e.g., background information that does not reveal an important part of a story).

As illustrated in FIG. 3D, the electronic device 300 (e.g., the IMU 130) detects a second positional change input 320. In response to detecting the second positional change input 320 in FIG. 3D, the electronic device 300 ceases to display the reader interface 302 and displays a first set of CGR representations 323 that is based on the second portion (e.g. "find a nice palm tree") of the reading content 306 in FIG. 3E. Namely, the first set of CGR representations 323 includes a dog CGR representation 323a walking towards a palm tree CGR representation 323c under a Sun CGR representation 323b. In some implementations, as illustrated in FIG. 3E, the electronic device 300 concurrently displays the first set of CGR representations 323 and pass-through image data including a physical object (e.g., the table 355) within a physical environment 322. The pass-through image data may be obtained by an image sensor 222 (e.g., rear facing camera) of the electronic device 300. The image sensor 222 is associated with a field-of-view 330. In some implementations, the electronic device 300 displays the first set of CGR representations 323 such that the first set of CGR representations 323 and physical object(s) within the physical environment 322 satisfy a spatial criterion. For example, in some implementations, the electronic device 300 displays the first set of CGR representations 323 overlaid on the pixels within the pass-through image data corresponding to physical objects within the physical environment 322. For example, as illustrated in FIG. 3E, the first set of CGR representations 323 sits on top of the table 355 so that the table 355 does not obscure the first set of CGR representations 323.

As illustrated in FIG. 3F, while the electronic device 300 is displaying the pass-through image data and the first set of CGR representations 323, the electronic device 300 (e.g., the IMU 130) detects a third positional change input 324. In response to detecting the third positional change input 324 in FIG. 3F, the electronic device 300 ceases to display the pass-through image data and the first set of CGR representations 323 and displays (e.g., redisplays) the reader interface 302 in FIG. 3G. In some implementations, as illustrated in FIG. 3G, the electronic device 300 does not display the previously displayed first CGR representation 318 corresponding to the first portion (e.g. "Blue was a good dog") of the reading content 306. For example, the electronic device 300 does not display the previously displayed first CGR representation 318 because the electronic device 300 has displayed the first set of CGR representations 323 corresponding to the second portion (e.g. "find a nice palm tree") of the reading content 306, and the second portion is later in the reading content than the first portion.

As illustrated in FIG. 3H, in some implementations, the electronic device 300 detects a first input 326 directed to the third reading content indicator 314. The first input 326 corresponds to a first input type. For example, in some implementations, the first input 326 corresponds to a touch input or stylus input detected on a touch-sensitive surface of the electronic device 300. As another example, in some implementations, the first input 326 is effected by an auxiliary device, such as the first input 326 corresponding to a mouse click input. As yet another example, in some implementations, the first input 326 corresponds to a long press input or a force touch input.

In response to detecting the first input 326 in FIG. 3H, the electronic device 300 displays pass-through image data (e.g., obtained via the image sensor 222) and a second set of CGR representations 328 in FIG. 3I. The second set of CGR representations 328 includes a dog CGR representation 328a that has reached a palm tree CGR representation 328c and is near a butterfly CGR representation 328d, all of which are under the Sun CGR representation 328b. In contrast to the dog CGR representation 323a illustrated in FIG. 3E, the dog CGR representation 328a illustrated in FIG. 3I is under the tree because the corresponding third portion (e.g. "butterfly flitting about") of the reading content 306 is later in the story (e.g., farther down) than the portion of the reading content 306 corresponding to "After he reached the tree." Moreover, the second set of CGR representations 328 includes the butterfly CGR representation 328d because the corresponding third portion of the reading content 306 is "butterfly flitting about."

In some implementations, rather than detecting the first input 326 of the first input type illustrated in FIG. 3H, the electronic device 300 detects a second input 332 directed to the third content indicator 314, as illustrated in FIG. 3J. The second input 332 corresponds to a second input type that is different from the first input type that is associated with the first input 326. For example, in some implementations, the second input 332 corresponds to a touch input or stylus input detected on a touch-sensitive surface of the electronic device 300. As another example, in some implementations, the second input 332 is effected by an auxiliary device, such as a mouse click input. As yet another example, in some implementations, the second input 332 corresponds to a long press input or a force touch input.

In response to detecting the second input 332 in FIG. 3J, the electronic device 300 displays a catalogue of animal objective-effectuators 334 in FIG. 3K. The catalogue of animal objective-effectuators 334 includes a butterfly objective-effectuator 334a corresponding to the butterfly CGR representation 328d, a dog objective-effectuator 334b corresponding to the dog CGR representation 328a, and a cat objective-effectuator 334c. Each of the catalogue of animal objective-effectuators 334 is characterized by a corresponding set of predefined objectives and a corresponding set of visual rendering attributes. In various implementations, an objective-effectuator performs one or more actions in order to effectuate (e.g., complete, satisfy, or achieve) one or more objectives. One of ordinary skill in the art will appreciate that a catalogue of objective-effectuators may include entities other than or in addition to animals, such as people (real or fictional), machines (e.g., automobiles, airplanes, etc.), weather patterns, and/or the like. The catalogue of animal objective-effectuators 334 also includes a current selection indicator 334d that indicates the currently selected objective-effectuator, which corresponds to the butterfly objective-effectuator 334a. The catalogue of animal objective-effectuators 334 also includes an objective-effectuator interface 339 request affordance 334e, the operation of which will be described below.

As illustrated in FIG. 3L, the electronic device 300 detects a third input 336 corresponding to dog objective-effectuator 334b. In response to detecting the third input 336 in FIG. 3L, the electronic device 300 changes the current selection indicator 334d from the butterfly objective-effectuator 334a to the dog objective-effectuator 334b, as illustrated in FIG. 3M.

As illustrated in FIG. 3N, the electronic device 300 detects a fourth input 338 corresponding to the objective-effectuator interface 339 request affordance 334e. In response to detecting the fourth input 338 in FIG. 3N, the electronic device 300 replaces the reader interface 302 with an objective-effectuator interface 339 in FIG. 3O. The objective-effectuator interface 339 includes an objective-effectuator pane 360, a new container affordance 362, and an emergent content container 364.

The objective-effectuator pane 360 includes the dog objective-effectuator 334b within a dog objective-effectuator container 370a, the butterfly objective-effectuator 334a within a butterfly objective-effectuator container 370b, and the cat objective-effectuator 334c within a cat objective-effectuator container 370c. Because the dog objective-effectuator 334b is currently selected as indicated by the current selection indicator 334e in FIG. 3N, the dog objective-effectuator 334b is positioned at the top of the objective-effectuator pane 360.

In various implementations, an objective-effectuator performs one or more actions. In some implementations, an objective-effectuator performs a sequence of actions. In some implementations, the emergent content container 364 determines the actions that an objective-effectuator is to perform. In some implementations, the actions of the objective effectuators are within a degree of similarity to actions that the corresponding characters/things perform. For example, in some implementations, the dog objective-effectuator 334b is characterized by objectives of chasing cars, fetching a ball, etc. As another example, in some implementations, the cat objective-effectuator 334c is characterized by objectives of chasing a mouse, napping, running away from a dog, etc.

In some implementations, the butterfly objective-effectuator container 370a includes a butterfly manipulation affordance 372b to manipulate the butterfly objective-effectuator 334a, the dog objective-effectuator container 370a includes a dog manipulation affordance 372a to manipulate the dog objective-effectuator 334b, and the cat objective-effectuator container 370c includes a cat manipulation affordance 372c to manipulate the cat objective-effectuator 334c. For example, a respective manipulation affordance enables rotation, size change, and/or positional change of the corresponding objective-effectuator.

In some implementations, the emergent content container 364 enables an objective-effectuator to perform actions that satisfy an objective (e.g., a set of predefined objectives) of the objective-effectuator. In some implementations, the electronic device 300 receives an input (e.g., a user input) to instantiate an objective-effectuator in the emergent content container 364. In such implementations, the emergent content container 364 generates actions for the objective-effectuator after the objective-effectuator is instantiated in the emergent content container 364. For example, in some implementations, the emergent content container 364 synthesizes actions that satisfy a set of predefined objectives for the objective-effectuator. In some implementations, the emergent content container 364 selects the actions from a set of predefined actions.

In some implementations, the emergent content container 364 includes a computer-mediated operating environment. For example, in some implementations, the computer-mediated operating environment forms a background for the emergent content container 364. In some implementations, the computer-mediated operating environment includes a virtual operating environment that is a simulated replacement of a real-world operating environment. In other words, in some implementations, the computer-mediated operating environment is simulated by the electronic device 300. In such implementations, the computer-mediated operating environment is different from a real-world operating environment where the electronic device 300 is located. In some implementations, the computer-mediated operating environment includes an augmented operating environment that is a modified version of a real-world operating environment. For example, in some implementations, the electronic device 300 modifies (e.g., augments) the real-world operating environment where the electronic device 300 is located in order to generate the computer-mediated operating environment. In some implementations, the electronic device 300 generates the computer-mediated operating environment by simulating a replica of the real-world operating environment where the electronic device 300 is located. In some implementations, the electronic device 300 generates the computer-mediated operating environment by removing and/or adding items from the simulated replica of the real-world operating environment where the electronic device 300 is located.

In some implementations, the emergent content container 364 is generated based on a user input. For example, in some implementations, the electronic device 300 receives a user input indicating a terrain for the emergent content container 364. In such implementations, the electronic device 300 configures the emergent content container 364 such that the emergent content container 364 includes the terrain indicated via the user input. In some implementations, the user input indicates environmental conditions. In such implementations, the electronic device 300 configures the emergent content container 364 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain or snow).

In some implementations, when the new container affordance 362 is selected, the electronic device 300 creates a new emergent content container. As such, in some implementations, the electronic device 300 displays multiple emergent content containers (e.g., two or more emergent content containers, such as the emergent content container 364 adjacent to one or more additional emergent content containers (not shown).

Referring to FIG. 3P, the electronic device 300 detects a fifth input 340 at a location corresponding to the dog objective-effectuator container 370a. In the example of FIG. 3P, the fifth input 340 corresponds to a request to instantiate the dog objective-effectuator 334b in the emergent content container 364. In the example of FIG. 3P, detecting the fifth input 340 includes detecting that the dog objective-effectuator container 370a has been selected, and that the dog objective-effectuator container 370a is being dragged into a display region that corresponds to the emergent content container 364. In some implementations, detecting the fifth input 340 includes detecting that the dog objective-effectuator container 370a is being dragged into the emergent content container 364.

Referring to FIG. 3Q, after detecting the fifth input 340 shown in FIG. 3P, the electronic device 300 instantiates the dog objective-effectuator 334b in the emergent content container 364. In the example of FIG. 3Q, the emergent content container 364 includes the dog objective-effectuator container 370a because the emergent content container 364 is being setup. In other words, in the example of FIG. 3Q, the emergent content container 364 is in an edit mode in which objective-effectuators are being added to the emergent content container 364.

As illustrated in FIG. 3Q, in various implementations, the emergent content container 364 includes various container affordances 366. In some implementations, the container affordances 366 are grouped into a container affordance bar. In various implementations, the container affordances 366 allow various operations to be performed in relation to the emergent content container 364. For example, in some implementations, the container affordances 366 include a screen capture affordance 366a which, in response to being selected, captures an image of the emergent content container 364. In some implementations, the container affordances 366 include a share affordance 366b which, in response to being selected, provides options to share the emergent content container 364 with other devices (e.g., other devices of the same user and/or other devices of other users).

In some implementations, the container affordances 366 include a microphone (mic) affordance 366c which, in response to being selected, allows the user of the electronic device 300 to interact with the objective-effectuators that are instantiated in the emergent content container 364. For example, in some implementations, in response to detecting a selection of the mic affordance 366c, the emergent content container 364 receives an audio input. In such implementations, the emergent content container 364 causes the objective-effectuators that are instantiated in the emergent content container 364 to respond to the audio input. For example, the emergent content container 364 changes the actions that the instantiated objective-effectuators perform in response to the audio input.

In some implementations, the container affordances 366 include a speaker affordance 366d that, when selected, enables the user of the electronic device 300 to control a volume associated with the emergent content container 364 (e.g., so that the user can listen to dialogues recited by the objective-effectuators instantiated in the emergent content container 364).

In some implementations, the container affordances 366 include content playback affordances such as a rewind affordance 366e, a play affordance 366f and a fast forward affordance 366g. In some implementations, a selection of the play affordance 366f causes the emergent content container 364 to transition from the edit mode to a play mode in which the objective-effectuators instantiated in the emergent content container 364 start performing their respective actions. In some implementations, the rewind affordance 366e, when selected, causes the content displayed by the emergent content container 364 to be rewound. In some implementations, the fast forward affordance 366g, when selected, causes the content displayed by the emergent content container 364 to be fast-forwarded. In some implementations, the container affordances 366 include a record affordance 366h that, when selected, causes the content displayed by the emergent content container 364 to be recorded.

In some implementations, the container affordances 366 include an add objective-effectuator affordance 366i that, when selected, provides an option to add an objective-effectuator to the emergent content container 364. In some implementations, the add objective-effectuator affordance 366i allows additional instances of an objective-effectuator that is already instantiated in the emergent content container 364 to be instantiated. In some implementations, the add objective-effectuator affordance 366i allows an instance of an objective-effectuator that is not currently instantiated in the emergent content container 364 to be instantiated.

In some implementations, the container affordances 366 include a duplicate objective-effectuator affordance 366j that, when selected, provides an option to duplicate (e.g., replicate) an objective-effectuator that is already instantiated in the emergent content container 364. In the example of FIG. 3Q, a selection of the duplicate objective-effectuator affordance 366j provides an option to duplicate the dog objective-effectuator 334b that is already instantiated in the emergent content container 364.

In some implementations, the container affordances 366 include a delete objective-effectuator affordance 366k that, when selected, provides an option to delete an objective-effectuator that is instantiated in the emergent content container 364. In the example of FIG. 3Q, a selection of the delete objective-effectuator affordance 366k provides an option to delete the dog objective-effectuator 334b that is already instantiated in the emergent content container 364.

FIGS. 3R-3T is an example of presenting CGR representations based on a positional change input that is independent of pass-through image data according to some implementations. As illustrated in FIG. 3R, the electronic device 300 displays the reader interface 302 including reading content 381 (different from the reading content 306 illustrated in FIGS. 3A-3N), the back affordance 303a, the forward affordance 303b, the share affordance 304a, the bookmarks affordance 304b, and the tabs affordance 304c. As further illustrated in FIG. 3R, the electronic device 300 displays a reading content indicator 382 corresponding to a portion (e.g. "on the hunt for an unsuspecting gazelle") of the reading content 381.

As illustrated in FIG. 3S, the electronic device 300 (e.g., the IMU 130) detects a fourth positional change input 384. In response to detecting the fourth positional change input 384 in FIG. 3S, the electronic device 300 ceases to display the reader interface 302 and displays a set of CGR representations that is based on the portion (e.g. "on the hunt for an unsuspecting gazelle") of the reading content 381, as illustrated in FIG. 3T. Namely, the set of CGR representations includes a CGR lion 390 on the hunt for an unsuspecting CGR gazelle 386, wherein the CGR lion 390 is hiding behind a CGR tree 388. Notably, in contrast to previous examples, the set of CGR representations is independent of characteristics of the physical environment 322 that is associated with a field-of-view of the image sensor 222 of the electronic device 300. For example, as illustrated in FIG. 3T, the electronic device 300 does not display the pass-through image data including the physical table 355 that is within the physical environment 322. Accordingly, in some implementations, the set of CGR representations corresponds to virtual reality (VR) content. In some implementations, as illustrated in FIGS. 3S and 3T, the electronic device 300 presents VR content, rather than AR content, because the fourth positional change input 384 corresponds to moving the electronic device 300 away from the table 355 within the physical environment 322. On the other hand, in some implementations, as illustrated in FIGS. 3D and 3E, in response to determining that the second positional change input 320 corresponds to moving the electronic device 300 towards the table 355, the electronic device 300 presents AR content that includes pass-through image data corresponding to the table 355.

Figure 4:
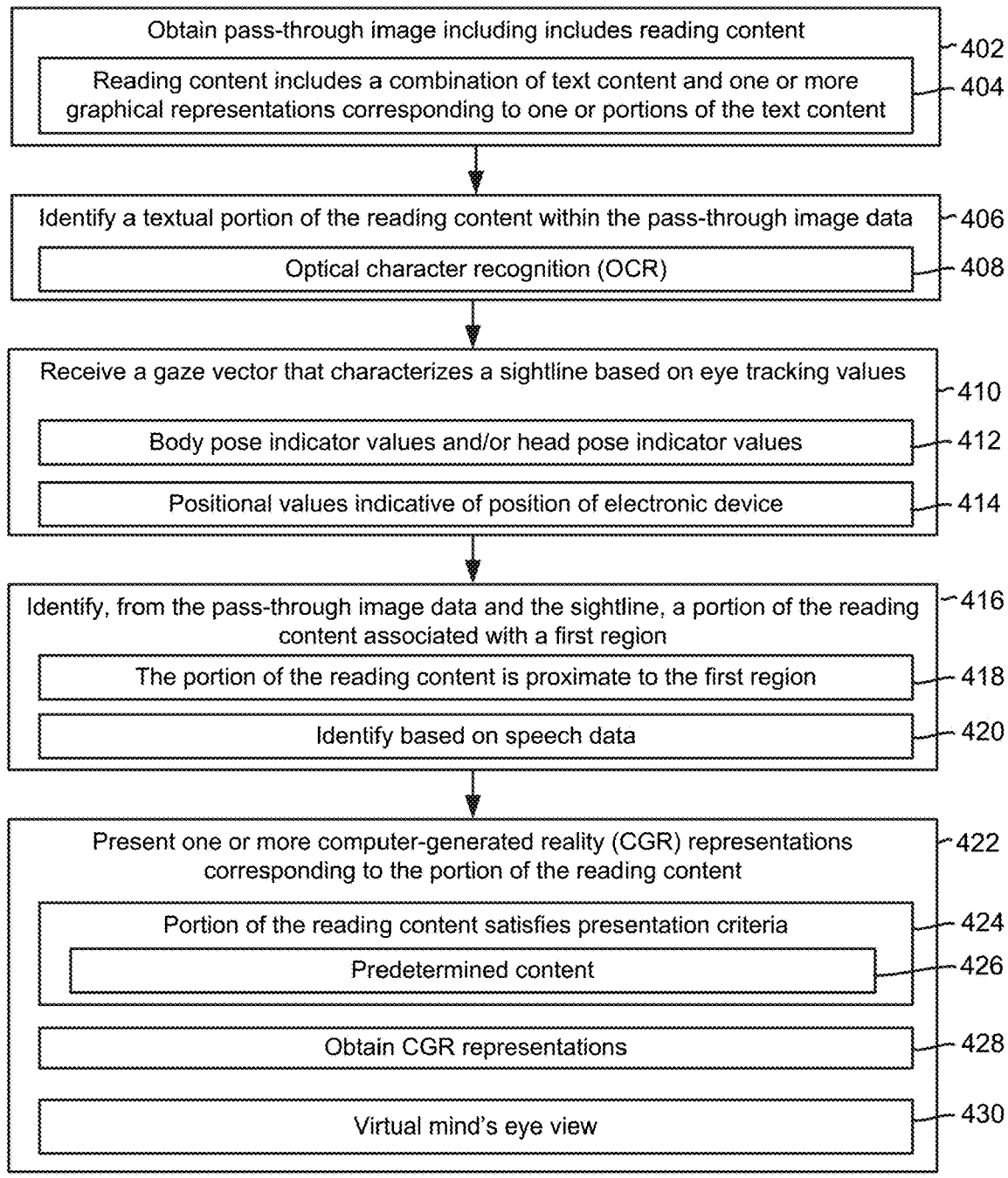
FIG. 4 is a flow diagram of a method of presenting CGR representations based on a gaze vector in accordance with some implementations.

FIG. 4 is a flow diagram of a method 400 of presenting CGR representations based on a gaze vector according to some implementations. In various implementations, the method 400 or portions thereof are performed by an electronic device (e.g., the electronic device 100 in FIG. 1, the electronic device 210 in FIG. 2A, and/or the HMD 220 in FIGS. 2B-2P). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, the method 400 includes determining, using pass-through image data and a gaze vector, a portion of reading content within a gaze region (e.g., what the user is looking at) and presenting CGR content associated with the portion of the reading content in focus.

As represented by block 402, the method 400 includes obtaining, from the image sensor, pass-through image data bounded by a field-of-view associated with the image sensor. The pass-through image data includes reading content.

As one example, with reference to FIG. 2A, the first image sensor 212 of the electronic device 210 (e.g., a tablet being held by the user 250) obtains the pass-through image data bounded by the field-of-view 212a associated with the first image sensor 212. As another example, with reference to FIGS. 2B-2P, the image sensor 222 of the HMD 220 being worn by the user 250 obtains the pass-through image data bounded by the field-of-view 222a associated with the image sensor 222. In some implementations, the reading content is included in a physical medium (e.g., a book, magazine, etc.). In some implementations, the reading content is included in an electronic medium (e.g., text presented by HMD). As represented by block 404, in some implementations, the reading content corresponds to a combination of text content and/or graphical representations (e.g., pictures describing the text content).

As represented by block 406, in some implementations, the method 400 includes identifying a textual portion of the reading content within the pass-through image data. For example, in some implementations, as represented by block 408, the method 400 includes utilizing optical character recognition (OCR) in identifying the reading content.

As represented by block 410, the method 400 includes obtaining a gaze vector using the eye tracking sensor. The gaze vector characterizes a sightline based on eye tracking values. In some implementations, the gaze vector includes eye tracking values that provide quantitative directional and angular information about the eye(s) of a user. For example, the eye tracking values may indicate positions (e.g., angle) of eyeballs and/or an angle of view with respect to the field-of-view. For example, with reference to FIG. 2A, the electronic device 210 obtains a gaze vector using the second image sensor 214 (e.g., rear-facing camera), wherein the gaze vector characterizes the sightline 230. As another example, with reference to FIGS. 2B-2P, the HMD 220 obtains a gaze vector using the eye tracking sensor 224 (e.g., eye tracking camera integrated within the HMD 220), wherein the gaze vector characterizes the sightline 230.

As represented by block 412, in some implementations, the gaze vector includes body pose indicator values and/or head pose indicator values. In some implementations, the body pose indicator values include orientation of certain body parts relative to other parts, such as indicating that a user is twisting his body in order to look around, the user is sitting down, etc. In some implementations, the head pose indicator values include levels of head tilt in two or three dimensions, such as the user's head is tilted backwards ten degrees, towards the user's right shoulder five degrees, etc.

As represented by block 414, in some implementations, the gaze vector includes positional values that indicate a position of the electronic device with respect to a physical environment including the surface. In some implementations, the positional data is computed based on the pass-through image data. In some implementations, the positional data indicates orientation, location, angle, etc. of the electronic device, such as values detected by the IMU 130 integrated within an electronic device (e.g., the HMD). In some implementations, the positional data is based on GPS data obtained from a GPS sensor integrated within an electronic device (e.g., the HMD).

As represented by block 416, the method 400 includes identifying, from the pass-through image data and the sightline characterized by the gaze vector, a portion of the reading content associated with a first region where the sightline intersects a surface including the reading content. For example, with reference to FIG. 2B, the HMD 220 identifies a portion 262a of the first reading content 261a associated with a first region 270a where the sightline 230 intersects a surface (e.g., the page of the book 260) including the first reading content 261a. In some implementations, the surface is a two-dimensional (2D) plane. In some implementations, the surface is a three-dimensional (3D) surface, such a volumetric region of space. In some implementations, the first region corresponds to a focus area (e.g., gaze target, focus point, gaze point, or point of regard) of the user. In some implementations, the first region is a point, circle, oval, etc. As represented by block 418, in some implementations, the portion of the reading content is proximate to the first region where the sightline intersects the surface including the reading content. As represented by block 420, in some implementations, the method 400 includes obtaining, via an audio sensor, speech data, and identifying the portion of the reading content in accordance with a determination that a comparison between the speech data and an audible representation of the portion of the reading content satisfies a confidence threshold. In some implementations, the electronic device generates the auditory representation via a text-to-speech application. In some implementations, the auditory representation is prerecorded.

As represented by block 422, the method 400 includes presenting one or more computer-generated reality (CGR) representations corresponding to the portion of the reading content. For example, with reference to FIGS. 2D and 2E, the HMD 220 displays the CGR representation of a dog 227a walking towards the CGR representation of the tree 227c on a sunny day as represented by the CGR representation of the Sun 227b. Continuing with this example, the CGR representations are based on the portion 262a of the first reading content 261a and other various portions of the first reading content 261a (e.g., the subsets 263-265 of the first reading content 261a and/or the companion content 266 of the first reading content 261a). In some implementations, a particular CGR representation is a graphical representation image, such as an image of a dog corresponding to the word "dog" in a story. In some implementations, a particular CGR representations is a video, such as a video of a dog walking towards a tree. In some implementations, presenting the one or more CGR representations includes displaying CGR content corresponding to the portion of the reading content, playing an audio clip corresponding to the portion of the reading content, and/or a combination thereof. In some implementations, the one or more CGR representations are spatially proximate to a corresponding portion of the reading content.

As represented by block 424, in some implementations, the method 400 includes presenting the one or more CGR representations in response to determining that the portion of the reading content satisfies one or more presentation criteria. In some implementations, as represented by block 426, in some implementations, determining that the portion of the reading content satisfies the one or more presentation criteria includes determining that the portion of the reading content is included within a predetermined set of reading content. For example, as represented by block 428, in some implementations, the method 400 includes obtaining (e.g., generating) the one or more CGR representations corresponding to the portion of the reading content. For example, in some implementations, the electronic device obtains a predetermined bank of content (e.g., curated content) corresponding to reading content that would be engaging/instructive to have presented as CGR representations, such as action sequences, a pivotal point in a story, a thesis of an essay, a portion of reading content known to be difficult to understand, and/or the like.

As represented by block 430, in some implementations, the method 400 includes presenting a virtual mind eye's view including CGR representations. For example, in some implementations, the method 400 includes determining, from the gaze vector, a change in position of the sightline from a first position to a second position and identifying, from the pass-through image data and the second position of the sightline, a second region where the sightline intersects a second surface that is outside of an area bounded by the reading content, wherein presenting the one or more CGR representations is performed in response to determining that the sightline intersects the second surface for a first threshold amount of time. For example, with reference to FIGS. 2G-2M, the HMD 220 determines a change in position of the sightline 230 corresponding to a change from the second region 270b to the third region 270c where the sightline 230 intersects a second surface (e.g., surface of the table 255 next to the book 260) that is outside of the second reading content 261b. In some implementations, the second region is proximate to the portion of the reading content. Continuing with this example, as illustrated in FIG. 2M, the HMD 220 presents the one or more CGR representations (e.g., CGR representations 227a-227c) in response to determining that the sightline 230 intersects the second surface for a first threshold amount of time. Moreover, an additional example of the virtual mind's eye view is provided above with reference to FIGS. 2N-2P.

In some virtual mind's eye implementations, the method 400 includes, in response to determining that the sightline intersects the second surface for a second threshold amount of time that is greater than the first threshold amount of time, ceasing to present the one or more CGR representations. For example, with reference to FIGS. 2N-2P, in response to determining that the sightline is associated with the second region 270e for the second threshold amount of time, the HMD 220 ceases to display the ethane CGR representation 290 and the propane CGR representation 292 because the user 250 wearing the HMD 220 may be bored or unengaged at that point.

In some virtual mind's eye implementations, the second region is within a threshold distance from reading content. For example, with reference to FIG. 2L, in some implementations, the third region 270c is the distance 280 away from companion content 267 of the second reading content 261b, wherein the distance 280 satisfies a respective distance threshold. As another example, with reference to FIG. 2O, in some implementations, the second region 270e is the distance 288 away from the companion content 286 (e.g., the first question of the "Chemistry Quiz") of the reading content 282, wherein the distance 288 satisfies a respective distance threshold. As yet another example, in some implementations, the second region is the threshold distance away from the portion of the reading content.

Figure 5:
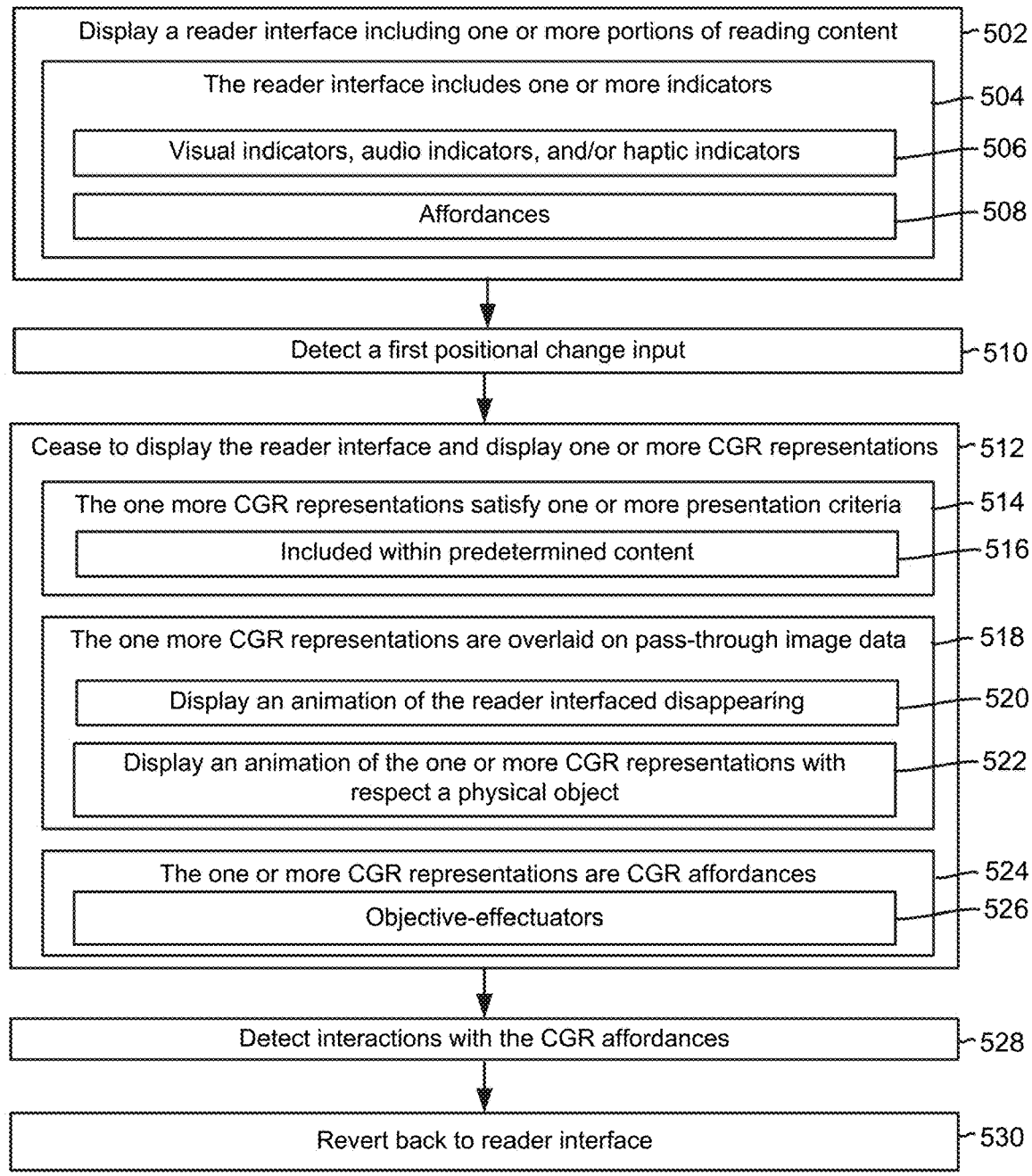
FIG. 5 is a flow diagram of a method of presenting CGR representations based on a positional change input in accordance with some implementations.

FIG. 5 is a flow diagram of a method 500 of presenting CGR representations based on a positional change input according to some implementations. In various implementations, the method 500 or portions thereof are performed by an electronic device (e.g., the electronic device 100 in FIG. 1 and/or the electronic device 300 in FIGS. 3A-3T). In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, the method 500 includes, in response to detecting a positional change of an electronic device, displaying pass-through image data and presenting CGR content associated with displayed reading content.

As represented by block 502, the method 500 includes displaying, on the display, a reader interface including one or more portions of reading content. The reading content corresponds to text content, graphical representations of the text content, or a combination thereof.

As represented by block 504, in some implementations, the reader interface includes one or more indicators indicating that the one or more CGR representations are displayable. For example, with reference to FIG. 3A, the reader interface 302 includes the first reading content indicator 310 corresponding to a first portion (e.g. "Blue was a good dog") of the reading content 306, the second reading content indicator 312 corresponding to a second portion (e.g. "find a nice palm tree") of the reading content 306, and the third reading content indicator 314 corresponding to a third portion (e.g. "butterfly flitting about") of the reading content 306. As represented by block 506, in some implementations, the one or more indicators correspond to a combination of one or more visual indicators, one or more audio indicators, or one or more haptic indicators. As represented by block 508, in some implementations, the one or more indicators correspond to one or more affordances. For example, with reference to FIGS. 3H and 3I, the third reading content indicator 314 corresponds to a respective affordance. Continuing with this example, in response to detecting the first input 326 directed to the respective affordance in FIG. 3H, the electronic device 300 ceases to display the reader interface 302 and displays the pass-through image data (e.g., obtained via the image sensor 222) and the second set of CGR representations 328 in FIG. 3I.

As represented by block 510, the method 500 includes detecting, via the one or more input devices, a first positional change input. The first positional change input is indicative of the electronic device changing from a first position to a second position. For example, with reference to FIG. 3S, the electronic device 300 (e.g., the IMU 130 of the electronic device 300) detects a fourth positional change input 384. For example, the first positional change input corresponds to the electronic device being shaken. As yet another example, the first positional change input corresponds to an HMD being moved (e.g., in response to a user nodding her head).

As represented by block 512, in response to detecting the first positional change input, the method 500 includes ceasing to display the reader interface including the one or more portions of reading content and displaying, on the display, one or more computer-generated reality (CGR) representations corresponding to the one or more portions of reading content. For example, in response to detecting the second positional change input 320 in FIG. 3D, the electronic device 300 ceases to display the reader interface 302 and displays the first set of CGR representations 323 that is based on the second portion (e.g. "find a nice palm tree") of the reading content 306, as illustrated in FIG. 3E. The first set of CGR representations 323 includes the dog CGR representation 323a walking towards the palm tree CGR representation 323c under the Sun CGR representation 323b. In some implementations, the one or more CGR representations are proximate to respective corresponding portions of the reading content. In some implementations, the CGR representations include accompanying audio, such as a prerecorded reading describing the visual CGR representation.

As represented by block 514, in some implementations, the one or more CGR representations satisfy one or more presentation criteria. As represented by block 516, in some implementations, the one or more CGR representations are included within a predetermined set of reading content. For example, in some implementations, the electronic device obtains a predetermined bank of content (e.g., curated content) corresponding to the highlights of the reading content or portions of the reading content that would be engaging/instructive to have presented as CGR representations, such as action sequences, a pivotal point in a story, a thesis of a news story, a turning point in a story, a portion of reading content known to be difficult to understand, and/or the like.

As represented by block 518, in some implementations, the one or more CGR representations are overlaid on pass-through image data. For example, in some implementations, the method 500 includes, in response to detecting the first positional change input, displaying, on the display, pass-through image data. The pass-through image data is obtained from an image sensor and is bounded by a field-of-view associated with the image sensor and the one more CGR representations are overlaid on the pass-through image data. For example, with reference to FIG. 3E, the electronic device 300 displays the first set of CGR representations 323 along with pass-through image data obtained via the image sensor 222 and bounded by the field-of-view 330 associated with the image sensor 222. As represented by block 520, in some implementations, the method 500 includes displaying an animation of the reader interface disappearing from the display. The animation is overlaid on pass-through image data. For example, in some implementations, the animation corresponds to a CGR object (e.g., a CGR representation of a book or newspaper) dropping from the display towards a physical surface (e.g., a table) and landing on the physical surface. For example, in some implementations, the CGR object is a book including a textual representation of the reading content, such as the title and author of a story corresponding to the reading content.

As represented by block 522, in some implementations, the method 500 includes displaying an animation of the one or more CGR representations with respect to a physical object represented in the pass-through image data. For example, with reference to FIG. 3E, the electronic device 300 displays the first set of CGR representations 323 sitting on top of the surface of the physical table 355 that exists in the physical environment 322. In this way, the electronic device avoids presenting CGR representations that are obscured by physical objects that are within the operating environment.

As represented by block 524, in some implementations, the one or more CGR representations correspond to one or more CGR affordances. For example, as represented by block 526, in some implementations, the one or more CGR affordances include an objective-effectuator. The objective-effectuator is characterized by a set of predefined objectives and a set of visual rendering attributes. For example, with reference to FIGS. 3K-3Q, the electronic device 300 provides various objective-effectuators based on the reading content 306, such as the dog objective-effectuator 334*b* corresponding to the "Blue the Dog" character in the reading content 306.

As represented by block 528, in some implementations, the electronic device detects a respective input corresponding to a particular one of the one or more CGR affordances corresponding to a particular one of the one or more CGR representations, and in response to detecting the respective input, modifies display of the particular one of the one or more CGR representations. For example, with reference to FIG. 3Q, the emergent content container 364 includes various container affordances 366 that enable various operations to be performed in relation to the emergent content container 364, which includes the dog objective-effectuator 334*b*. As another example, in some implementations, modifying display of the particular one of the one or more CGR representation includes ceasing to displaying the particular one of the one or more CGR representations. As yet another example, in some implementations, modifying display of the particular one of the one or more CGR representation includes modifying an attribute (e.g., size, shape, color, arrangement, location, etc.) of the particular one of the one or more CGR representations.

As represented by block 530, in some implementations, the method 500 includes reverting back to (e.g., restoring) the reader interface. For example, in some implementations, the method 500 includes, after ceasing to display the reader interface and displaying the one or more CGR representations, detecting, via the one or more input devices, a second positional change input, and in response to detecting the second positional change input: ceasing to display the one or more CGR representations; and displaying, on the display, the reader interface including the one or more portions of reading content. For example, in response to detecting the third positional change input 324 in FIG. 3F, the electronic device 300 displays the reader interface 302 including the reading content 306 in FIG. 3G.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device with one or more processors, a non-transitory memory, one or more input devices, and a display:
displaying, on the display, a reader interface including one or more portions of reading content;
obtaining one or more eye tracking values characterizing a sightline of a user of the electronic device;
identifying a first portion of the reading content based on an intersection between the sightline of the user and the reader interface;
obtaining one or more computer-generated representations that correspond to the first portion of the reading content;
detecting, via the one or more input devices, a first positional change input, wherein the first positional change input is indicative of a head pose change associated with the user of the electronic device; and
in response to detecting the first positional change input:
ceasing to display the reader interface including the one or more portions of the reading content; and
displaying, on the display, the one or more computer-generated representations within a representation of a physical environment associated with the electronic device, wherein the one or more computer-generated representations respectively correspond to the first portion of the reading content.

2. The method of claim 1, wherein the one or more computer-generated representations satisfy one or more presentation criteria.

3. The method of claim 1, wherein the one or more computer-generated representations are included within a predetermined set of the reading content.

4. The method of claim 1, further comprising:
after ceasing to display the reader interface and displaying the one or more computer-generated representations, detecting, via the one or more input devices, a second positional change input; and
in response to detecting the second positional change input:
ceasing to display the one or more computer-generated representations; and
displaying, on the display, the reader interface including the one or more portions of the reading content.

5. The method of claim 1, wherein displaying the representation of the physical environment corresponds to displaying, on the display, pass-through image data, wherein the pass-through image data is obtained from an image sensor and is bounded by a field-of-view associated with the image sensor, and wherein the one or more computer-generated representations are overlaid on the pass-through image data.

6. The method of claim 5, wherein ceasing to display the reader interface includes displaying an animation of the reader interface disappearing from the display, and wherein the animation is overlaid on the pass-through image data.

7. The method of claim 5, wherein displaying the one more computer-generated representations overlaid on the pass-through image data includes displaying an animation of the one more computer-generated representations with respect to a physical object represented in the pass-through image data.

8. The method of claim 1, wherein the reader interface includes one or more indicators indicating that the one or more computer-generated representations are displayable.

9. The method of claim 8, wherein the one or more indicators correspond to a combination of one or more visual indicators, one or more audio indicators, or one or more haptic indicators.

10. The method of claim 8, wherein the one or more indicators correspond to one or more affordances.

11. The method of claim 1, wherein the one or more input devices includes an inertial measurement unit (IMU) sensor that detects the first positional change input.

12. The method of claim 1, wherein the one or more computer-generated representations correspond to one or more computer-generated affordances.

13. The method of claim 12, further comprising:
detecting a respective input corresponding to a particular one of the one or more computer-generated affordances corresponding to a particular one of the one or more computer-generated representations; and
in response to detecting the respective input, modifying display of the particular one of the one or more computer-generated representations.

14. The method of claim 12, wherein the one or more computer-generated affordances include an objective-effectuator, and wherein the objective-effectuator is characterized by a set of predefined objectives and a set of visual rendering attributes.

15. The method of claim 1, further comprising obtaining the one or more computer-generated representations corresponding to the one or more portions of the reading content.

16. An electronic device comprising:
one or more processors;
a non-transitory memory;
a display;
one or more input devices; and
one or more programs, wherein the one or more programs are stored in the non-transitory memory and configured to be executed by the one or more processors, the one or more programs including instructions for:
displaying, on the display, a reader interface including one or more portions of reading content;
obtaining one or more eye tracking values characterizing a sightline of a user of the electronic device;
identifying a first portion of the reading content based on an intersection between the sightline of the user and the reader interface;
obtaining one or more computer-generated (CG) representations that correspond to the first portion of the reading content;
detecting, via the one or more input devices, a first positional change input, wherein the first positional change input is indicative of a head pose change associated with the user of the electronic device; and in response to detecting the first positional change input:

ceasing to display the reader interface including the one or more portions of the reading content; and displaying, on the display, the one or more computer-generated representations within a representation of a physical environment associated with the electronic device, wherein the one or more computer-generated representations respectively correspond to the first portion of the reading content.

17. The electronic device of claim 16, the one or more programs including instructions for:

after ceasing to display the reader interface and displaying the one or more computer-generated representations, detecting, via the one or more input devices, a second positional change input; and in response to detecting the second positional change input:

ceasing to display the one or more computer-generated representations; and displaying, on the display, the reader interface including the one or more portions of the reading content.

18. The electronic device of claim 16, wherein the one or more input devices includes an inertial measurement unit (IMU) sensor that detects the first positional change input.

19. The electronic device of claim 16, wherein ceasing to display the reader interface includes displaying an animation of the reader interface disappearing from the display, and wherein the animation is overlaid on pass-through image data that is obtained from an image sensor included in the electronic device.

20. A non-transitory computer readable storage medium storing one or more programs, the one or more programs comprising instructions, which, when executed by an electronic device with one or more processors, a display, and one or more input devices, cause the electronic device to:

display, on the display, a reader interface including one or more portions of reading content;

obtain one or more eye tracking values characterizing a sightline of a user of the electronic device;

identify a first portion of the reading content based on an intersection between the sightline of the user and the reader interface;

obtain one or more computer-generated (CG) representations that correspond to the first portion of the reading content;

detect, via the one or more input devices, a first positional change input, wherein the first positional change input is indicative of a head pose change associated with the user of the electronic device; and in response to detecting the first positional change input:

cease to display the reader interface including the one or more portions of the reading content; and display, on the display, one or more computer-generated representations within a representation of a physical environment associated with the electronic device, wherein the one or more computer-generated representations respectively correspond to the first portion of the reading content.

* * * * *